US012657949B2

(12) United States Patent
Zhang et al.

(10) Patent No.: US 12,657,949 B2
(45) Date of Patent: Jun. 16, 2026

(54) METHOD AND APPARATUS FOR GENERATING PALMPRINT SAMPLE, DEVICE, AND MEDIUM

(71) Applicant: TENCENT TECHNOLOGY (SHENZHEN) COMPANY LIMITED, Shenzhen (CN)

(72) Inventors: Yingyi Zhang, Shenzhen (CN); Kai Zhao, Shenzhen (CN); Lei Shen, Shenzhen (CN); Ruixin Zhang, Shenzhen (CN); Chuhan Zhou, Shenzhen (CN); Tao Wang, Shenzhen (CN); Shouhong Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 484 days.

(21) Appl. No.: 18/451,515

(22) Filed: Aug. 17, 2023

(65) Prior Publication Data

US 2023/0394869 A1 Dec. 7, 2023

Related U.S. Application Data

(63) Continuation of application No. PCT/CN2022/133470, filed on Nov. 22, 2022.

(30) Foreign Application Priority Data

Feb. 28, 2022 (CN) .......................... 202210189742.8

(51) Int. Cl.
*G06V 40/12* (2022.01)
*G06V 10/422* (2022.01)
(Continued)

(52) U.S. Cl.
CPC ........ *G06V 40/1347* (2022.01); *G06V 10/422* (2022.01); *G06V 10/44* (2022.01); *G06V 10/774* (2022.01)

(58) Field of Classification Search
CPC .... G06V 10/774; G06V 10/422; G06V 10/44; G06V 40/12; G06V 40/1347–1382
See application file for complete search history.

(56) References Cited

U.S. PATENT DOCUMENTS

2016/0104030 A1 4/2016 Matsunami

FOREIGN PATENT DOCUMENTS

CN 105512530 A 4/2016
CN 108427923 A 8/2018
(Continued)

OTHER PUBLICATIONS

The European Patent Office (EPO) The Extended European Search Report for Application No. 22928308.0 Feb. 27, 2025 12 Pages.
(Continued)

*Primary Examiner* — Casey L Kretzer
(74) *Attorney, Agent, or Firm* — Anova Law Group, PLLC

(57) ABSTRACT

A method for generating a palmprint sample includes: generating positioning point data according to a palmprint principal line distribution rule, the positioning point data comprising first data corresponding to a first principal line positioning point and second data corresponding to a second principal line positioning point; generating adjusting point data according to a palmprint principal line curving rule, a principal line adjusting point corresponding to the adjusting point data being configured to control a curving parameter of a principal line formed by the first principal line positioning point and the second principal line positioning point; generating a palmprint principal line based on the first data, the
(Continued)

second data and the adjusting point data; and generating at least one palmprint sample comprising the palmprint principal line.

20 Claims, 15 Drawing Sheets

(51) Int. Cl.
  *G06V 10/44*       (2022.01)
  *G06V 10/774*      (2022.01)

(56)                    References Cited

FOREIGN PATENT DOCUMENTS

| | | | | | |
|---|---|---|---|---|---|
| CN | 108615002 | A | 10/2018 | | |
| CN | 109472213 | A | 3/2019 | | |
| CN | 110163062 | A | 8/2019 | | |
| CN | 110826452 | A | 2/2020 | | |
| CN | 111950492 | A | * 11/2020 | ........... | G06F 18/214 |
| CN | 112149521 | A | 12/2020 | | |
| WO | 2019034589 | A1 | 2/2019 | | |

OTHER PUBLICATIONS

Thomas Cook. "the development of automated Palmprint identification using major flexion creases." (2012).
Vani Perumal et al., "Pattern Recognition of Palm Print and Footprint Images for their Effective Storage Management—A Nonlinear Approach." (2017).
Kai Zhao et al. "Geometric Synthesis: A Free lunch for Large-scale Palmprint Recognition Model Pretraining." arXiv preprint arXiv:2203. 05703 (2022).
Jianjiang Feng et al., "A preliminary study of handprint synthesis." Chinese Conference on Biometric Recognition. Berlin, Heidelberg: Springer Berlin Heidelberg, 2011.
Zhuoshi Wei et al. "Palmprint image synthesis: A preliminary study." 2008 15th IEEE International Conference on Image Processing. IEEE, 2008.
The World Intellectual Property Organization (WIPO) International Search Report for PCT/CN2022/133470 Jan. 18, 2023 7 Pages (including translation).
The State Intellectual Property Office of the People's Republic of China (SIPO) Office Action 1 for 202210189742.8, Apr. 7, 2023 8 Pages (including translation).
Nuoya Xu, Research on palmprint recognition in complex scenes, China Excellent Master's Thesis Full Text Database Information Technology Series, vol. 2021, Jul. 15, 2021.
Zhuoshi Wei et al., Palmprint image synthesis: A preliminary study, 2018 15th IEEE International Conference on Image Processing, Dec. 12, 2008. pp. 285-288.
Sheng Chen et al. "Mobilefacenets: Efficient cnns for accurate real-time face verification on mobile devices." Biometric Recognition: 13th Chinese Conference, CCBR 2018, Urumqi, China, Aug. 11-12, 2018, Proceedings 13. Springer International Publishing, 2018.

Jia Deng et al. "Imagenet: A large-scale hierarchical image database." 2009 IEEE conference on computer vision and pattern recognition. Ieee, 2009.
Jiankang Deng et al. "Arcface: Additive angular margin loss for deep face recognition." Proceedings of the IEEE/CVF conference on computer vision and pattern recognition. 2019.
Miguel A. Ferrer et al., "BiSpectral contactless hand based biometric system." CONATEL 2011. IEEE, 2011.
Angelo Genovese et al. "PalmNet: Gabor-PCA convolutional networks for touchless palmprint recognition." IEEE Transactions on Information Forensics and Security 14.12 (2019): 3160-3174.
Ying Hao et al. "Multispectral palm image fusion for accurate contact-free palmprint recognition." 2008 15th IEEE International Conference on Image Processing. IEEE, 2008.
Ahmad Hassanat et al. "New mobile phone and webcam hand images databases for personal authentication and identification." Procedia Manufacturing 3 (2015): 4060-4067.
Kaiming He et al. "Deep residual learning for image recognition." Proceedings of the IEEE conference on computer vision and pattern recognition. 2016.
Vivek Kanhangad et al., "Contactless and pose invariant biometric identification using hand surface." IEEE transactions on image processing 20.5 (2010): 1415-1424.
Ajay Kumar. "Incorporating cohort information for reliable palmprint authentication." 2008 Sixth Indian conference on computer vision, graphics & image processing. IEEE, 2008.
Wojciech Michal Matkowski et al., "Palmprint recognition in uncontrolled and uncooperative environment." IEEE Transactions on Information Forensics and Security 15 (2019): 1601-1615.
Huikai Shao et al., "Few-shot palmprint recognition via graph neural networks." Electronics Letters 55.16 (2019): 890-892.
Huikai Shao et al., "Effective deep ensemble hashing for open-set palmprint recognition." Journal of Electronic Imaging 29.1 (2020): 013018-013018.
Huikai Shao et al., "Deep distillation hashing for unconstrained palmprint recognition." IEEE Transactions on Instrumentation and Measurement 70 (2021): 1-13.
Zhenan Sun et al. "Ordinal palmprint represention for personal identification [representation read representation]." 2005 IEEE computer society conference on computer vision and pattern recognition (CVPR'05). vol. 1. IEEE, 2005.
David Zhang et al. "An online system of multispectral palmprint verification." IEEE transactions on instrumentation and measurement 59.2 (2009): 480-490.
Yingyi Zhang et al. "Towards palmprint verification on smartphones." arXiv preprint arXiv:2003.13266 (2020).
Dexing Zhong et al., "Centralized large margin cosine loss for open-set deep palmprint recognition." IEEE Transactions on Circuits and Systems for Video Technology 30.6 (2019): 1559-1568.
Creases Synthesis: A Free Lunch for Palmprint Recognition, Anonymous CVPR 2022 Submission, Paper ID 1469. Confidential Review Copy.
COEP palm print database. https://www.coep.org.in/resources/coeppalmprintdatabase.

* cited by examiner

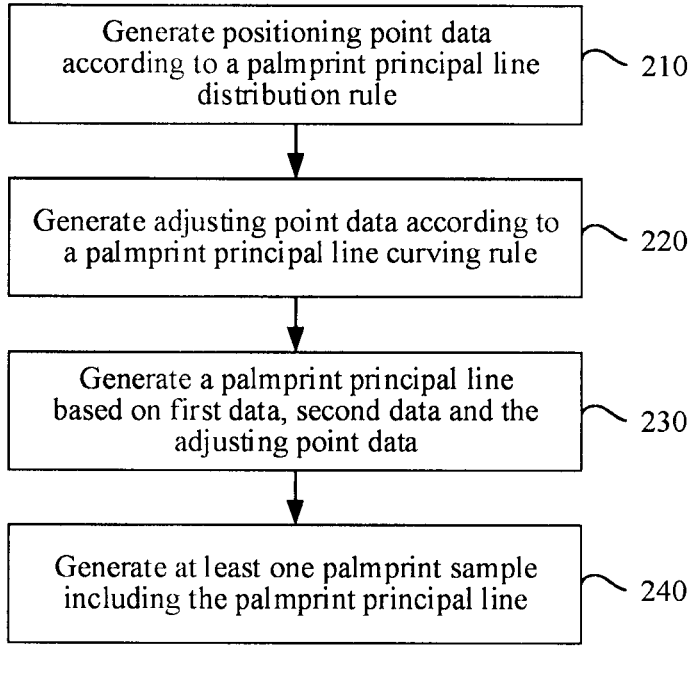

Generate positioning point data
according to a palmprint principal line
distribution rule ~ 210

Generate adjusting point data according to
a palmprint principal line curving rule ~ 220

Generate a palmprint principal line
based on first data, second data and the
adjusting point data ~ 230

Generate at least one palmprint sample
including the palmprint principal line ~ 240

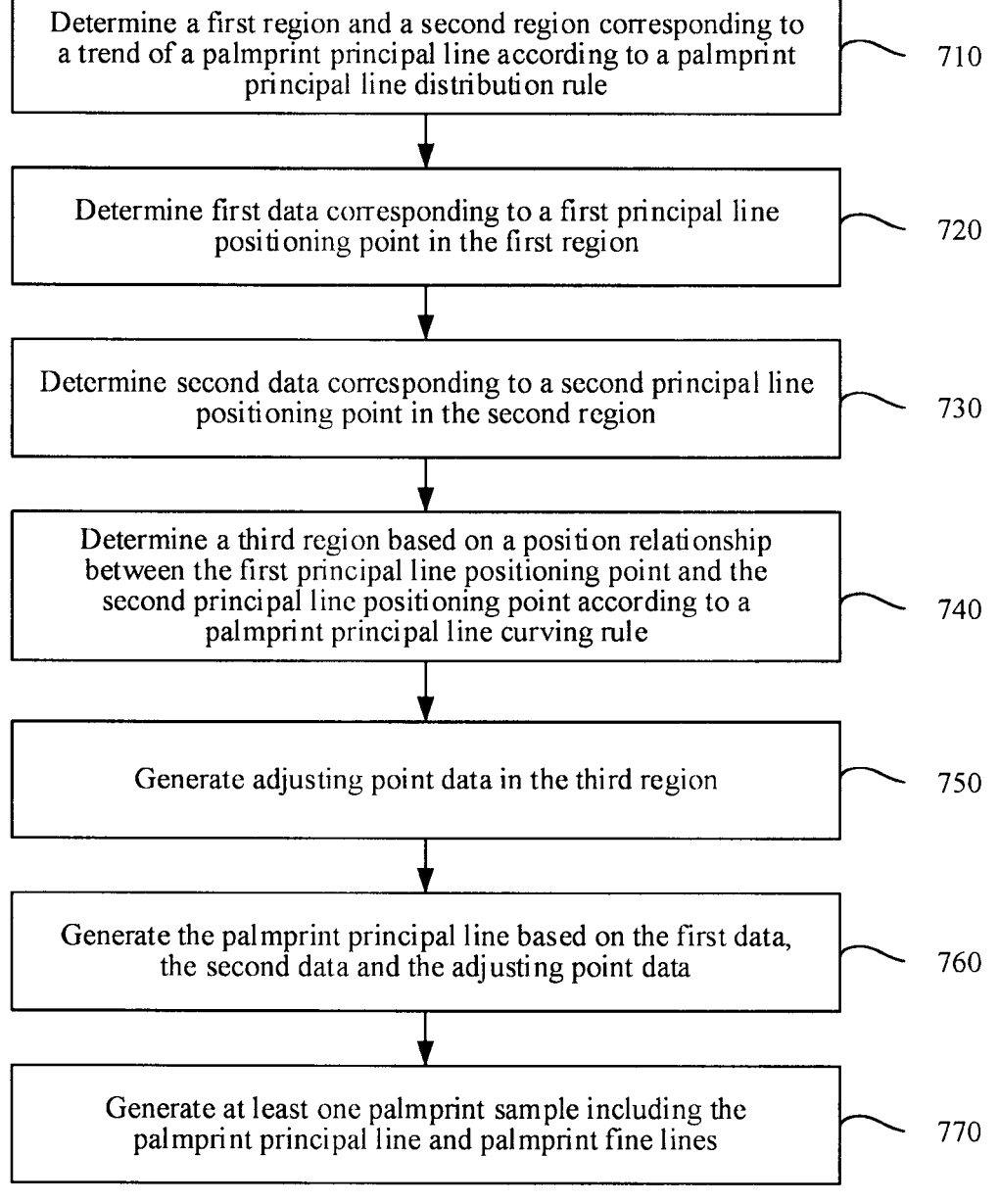

Determine a first region and a second region corresponding to a trend of a palmprint principal line according to a palmprint principal line distribution rule    710

Determine first data corresponding to a first principal line positioning point in the first region    720

Determine second data corresponding to a second principal line positioning point in the second region    730

Determine a third region based on a position relationship between the first principal line positioning point and the second principal line positioning point according to a palmprint principal line curving rule    740

Generate adjusting point data in the third region    750

Generate the palmprint principal line based on the first data, the second data and the adjusting point data    760

Generate at least one palmprint sample including the palmprint principal line and palmprint fine lines    770

FIG. 7

Acquire a sample image set 1210

Combine a palmprint sample with a sample image by using the sample image as a background to obtain a target image 1220

Train a palmprint recognition model by using the target image 1230

METHOD AND APPARATUS FOR GENERATING PALMPRINT SAMPLE, DEVICE, AND MEDIUM

CROSS-REFERENCES TO RELATED APPLICATIONS

This application is a continuation application of PCT Patent Application No. PCT/CN2022/133470, filed on Nov. 22, 2022, which claims priority to Chinese Patent Application No. 202210189742.8, filed with the Chinese Patent Office on Feb. 28, 2022 and entitled "METHOD AND APPARATUS FOR GENERATING PALMPRINT SAMPLE, DEVICE, MEDIUM AND PROGRAM PRODUCT", the entire contents of both of which are incorporated herein by reference.

FIELD OF THE TECHNOLOGY

An embodiment of the present disclosure relates to the field of machine learning, and particularly relates to a method and apparatus for generating a palmprint sample, a device, a medium and a program product.

BACKGROUND

With the rapid development of information technology, a palmprint recognition technology has been applied to a wider range in various identity identification scenarios due to its reliability and convenience. The palmprint recognition refers to an identity recognition performed according to features such as principal lines, textures and wrinkles in a hand palm. Compared with face recognition, the palmprint recognition belongs to a non-invasive recognition method, and can be more easily accepted by a user.

In related art, during palmprint recognition, a technical solution based on deep learning is generally adopted, and an internal rule of palmprint information on a stored palmprint image is learned, so that a model learns a potential feature with distinguishing power, and the palmprint is analyzed by using the model obtained through training to thus perform an identity information recognition process.

However, during identity information recognition by the deep learning method, a deep network model generally depends on a mass palmprint image set and accurate labeling information, and the palmprint information has high privacy and safety, so that there is a lack of a great number of public datasets for the model to learn in the palmprint recognition field, and the recognition effect of the model on the identity information is poor.

SUMMARY

An embodiment of the present disclosure provides a method and apparatus for generating a palmprint sample, a device, a medium and a program product.

On the one hand, a method for generating a palmprint sample is provided, is executed by a computer device, and includes: generating positioning point data according to a palmprint principal line distribution rule, the positioning point data including first data corresponding to a first principal line positioning point and second data corresponding to a second principal line positioning point; generating adjusting point data according to a palmprint principal line curving rule, a principal line adjusting point corresponding to the adjusting point data being configured to control a curving parameter of a principal line formed by the first principal line positioning point and the second principal line positioning point; generating a palmprint principal line based on the first data, the second data and the adjusting point data; and generating at least one palmprint sample including the palmprint principal line.

On the other hand, an apparatus for generating a palmprint sample is provided, and includes: a positioning point generation module, configured to generate positioning point data according to a palmprint principal line distribution rule, the positioning point data including first data corresponding to a first principal line positioning point and second data corresponding to a second principal line positioning point; an adjusting point generation module, configured to generate adjusting point data according to a palmprint principal line curving rule, a principal line adjusting point corresponding to the adjusting point data being configured to control a curving parameter of a principal line formed by the first principal line positioning point and the second principal line positioning point; a principal line generation module, configured to generate a palmprint principal line based on the first data, the second data and the adjusting point data; and a sample generation module, configured to generate at least one palmprint sample including the palmprint principal line, the palmprint sample a training sample for a palmprint recognition model, and the palmprint recognition model being used for palmprint recognition.

On the other hand, a computer device is provided, and includes at least one processor and at least one memory, the at least one memory stores at least one instruction, at least one program, and a code set or an instruction set, and the at least one instruction, the at least one program, and the code set or the instruction set is loaded and executed by the at least one processor to implement any one method for generating a palmprint sample according to an embodiment of the present disclosure.

On the other hand, a non-transitory computer-readable storage medium is provided. The storage medium stores at least one instruction, at least one program, and a code set or an instruction set, and the at least one instruction, the at least one program, and the code set or the instruction set is loaded and executed by at least one processor to implement any one method for generating a palmprint sample according to an embodiment of the present disclosure.

Details of one or more embodiments of the present disclosure are provided in the accompanying drawings and descriptions below. Other features, objectives, and advantages of the present disclosure become apparent from the specification, the drawings, and the claims.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure.

FIG. 2 is a flowchart of a method for generating a palmprint sample according to an exemplary embodiment of the present disclosure.

FIG. 7 is a flowchart of a method for generating a palmprint sample according to another exemplary embodiment of the present disclosure.

DESCRIPTION OF EMBODIMENTS

Figure 1:
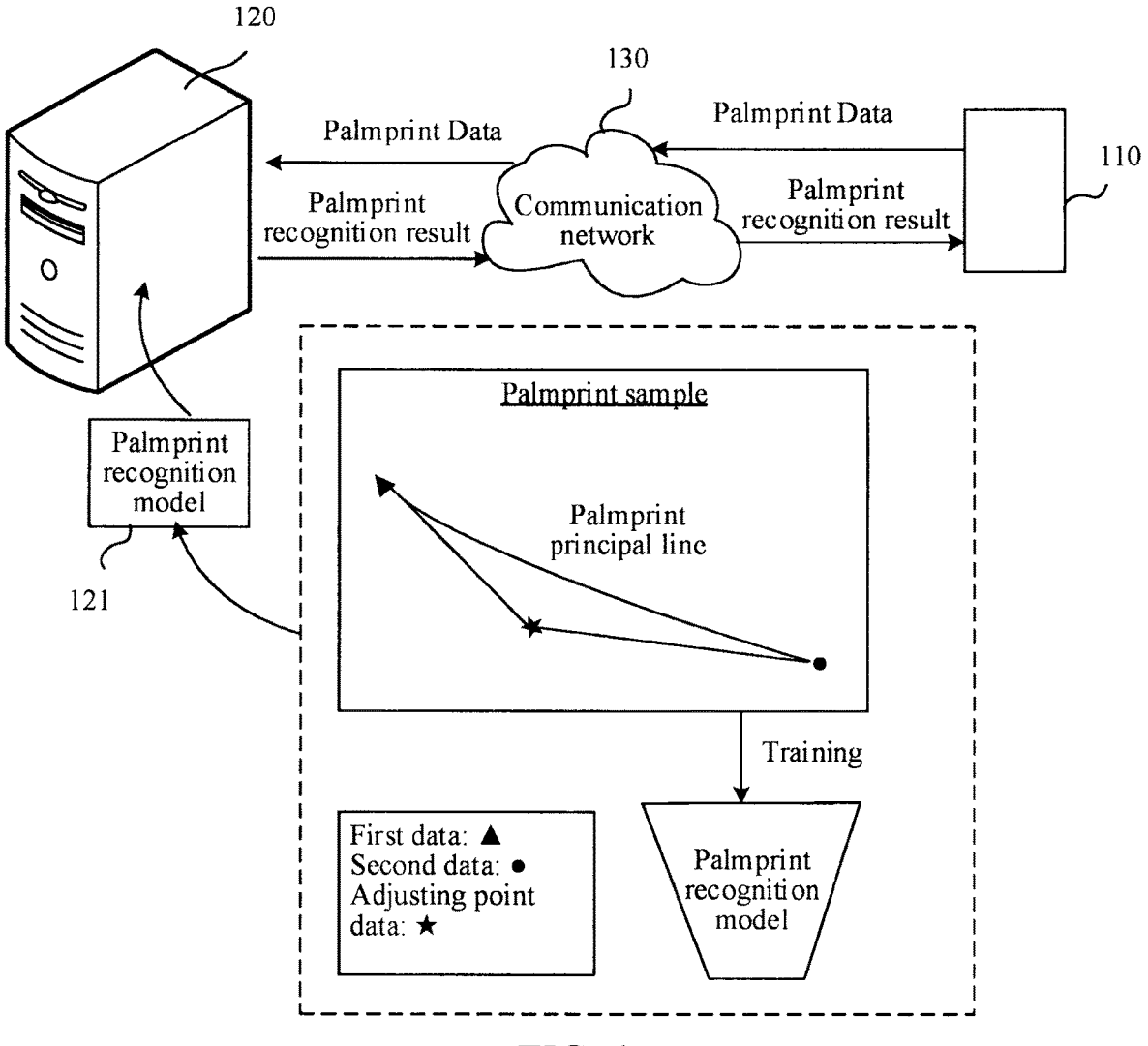
FIG. 1 is a schematic diagram of an implementation environment according to an exemplary embodiment of the present disclosure.

To make the objectives, technical solutions, and advantages of the present disclosure clearer, the following further describes implementations of the present disclosure in detail with reference to the accompanying drawings.

In related art, during palmprint recognition, a technical solution based on deep learning is generally adopted, and an internal rule of palmprint information on a stored palmprint image is learned, so that a model learns a potential feature with distinguishing power, and the palmprint is analyzed by using the model obtained through training to thus perform an identity information recognition process. However, during identity information recognition by the deep learning method, a deep network model generally depends on a mass palmprint image set and accurate labeling information, and the palmprint information has high privacy and safety, so that there is a lack of a great number of public datasets for the model to learn in the palmprint recognition field, and the recognition effect of the model on the identity information is poor.

In an embodiment of the present disclosure, a method for generating a palmprint sample is provided, so that a higher diversity is realized between generated palmprint samples, and the robustness of a palmprint recognition model trained by the palmprint sample is further improved. A method for generating a palmprint sample obtained through training according to the present disclosure includes at least one of the following scenarios.

1. A Training Scenario of a Palmprint Recognition Model

In view of privacy of palmprint data and complexity of acquiring manners of palmprint data, few palmprint data is stored in a palmprint database. During training on the palmprint recognition model based on the palmprint data in the palmprint database, it is difficult to reach a better training effect. Exemplarily, by adopting the method for generating a palmprint sample, positioning point data is generated according to a palmprint principal line distribution rule, adjusting point data is generated according to a palmprint principal line curving rule, a plurality of palmprint principal lines are determined according to the positioning point data and the adjusting point data, a plurality of palmprint samples including the palmprint principal lines are further obtained, the palmprint recognition model can learn more diversified palmprint features during training on the palmprint recognition model through the palmprint samples, and the accuracy of the palmprint recognition model in the palmprint recognition process is improved.

2. A Palmprint Encryption Scenario

Exemplarily, by taking palmprint of a hand palm as an example, different palmprint texture images may be obtained from the palmprint textures due to parameters such as different spreading shapes of the hand palm, the illumination change during shooting, and noise caused by a photographic device. At different moments, a misjudgment may occur when placing the same hand palm on a palmprint encryption instruction. Exemplarily, by adopting the method for generating a palmprint sample, positioning point data is generated according to a palmprint principal line distribution rule, adjusting point data is generated according to a palmprint principal line curving rule, a plurality of palmprint principal lines are determined according to the positioning point data and the adjusting point data, a plurality of palmprint samples including the palmprint principal lines are further obtained, a display manner of the palmprint sample under more conditions may be obtained by using the plurality of palmprint samples with diversity as a recognition standard, the defect of high recognition difficulty due to the small palmprint quantity may be overcome to a great extent, and an analysis process on the palmprint at the finer graininess can be realized.

The above application scenarios are only exemplary examples. The method for generating a palmprint sample provided by this embodiment may also be applied to other scenarios, and it is not limited by the embodiments of the present disclosure.

The information (including but not limited to user equipment information, user personal information, etc.), data (including but not limited to data used for analysis, stored data, displayed data, etc.) and signals involved in the present disclosure are authorized by the user or fully authorized by all parties, and the collection, use and processing of relevant data shall comply with relevant laws, regulations and standards of relevant countries and regions. For example, the palmprint data involved in the present disclosure is all acquired under fully authorized conditions.

Secondly, for illustration on an implementation environment involved in embodiments of the present disclosure, exemplarily, with reference to FIG. 1, in this implementation environment, a terminal 110 and a server 120 are involved, and the terminal 110 and the server 120 are connected through a communication network 130.

In some embodiments, an application program with a palmprint data acquiring function is installed in the terminal 110. In some embodiments, the terminal 110 is configured to transmit palmprint data to the server 120. The palmprint data includes image data corresponding to the palmprint, and also includes texture data corresponding to the palmprint, etc. The server 120 can determine data information such as the palmprint principal line distribution rule and the palmprint principal line curving rule according to the palmprint data, recognize the palmprint according to a palmprint recognition model 121 based on the palmprint principal line distribution rule and the palmprint principal line curving rule, and may display the palmprint recognition result after the palmprint recognition on the terminal 110.

The palmprint recognition model 121 is obtained through training by adopting the following method: first data representing and corresponding to a first principal line positioning point (e.g., a start point) and second data representing and corresponding to a second principal line positioning data (e.g., an end point) are generated according to the palmprint principal line distribution rule; adjusting point data for controlling curving situation of the principal line (e.g., a control point) is generated according to the palmprint principal line curving rule; and a curve obtained by connecting the first principal line positioning point and the second principal line positioning point with a curving parameter controlled by the principal line adjusting point is used as a palmprint principal line, at least one palmprint sample including the palmprint principal line is generated, and the palmprint recognition model is trained by using the palmprint sample. The above process is a non-unique case example of a training process of the palmprint recognition model 121.

The terminal includes, but is not limited to, a mobile terminal such as a mobile phone, a tablet computer, a portable laptop computer, an intelligent voice interaction device, an intelligent household appliance and a vehicle-mounted terminal, and may also be implemented as a desktop computer; and the server may be an independent physical server, may also be a server cluster or a distributed system composed of a plurality of physical servers, and may also be a cloud server providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform.

The cloud technology refers to a hosting technology which unifies series resources such as hardware, application programs and networks in a wide area network or a local area network to realize the data computing, storage, processing and sharing. The cloud technology is a generic term of a network technology, an information technology, an integration technology, a management platform technology, an application technology, etc. based on cloud computing business model application, can form a pool of resources to be used as needed, and is flexible and convenient. The cloud computing technology will become an important support. A background service of a technical network system requires a lot of computing and storage resources, such as video websites, picture websites and more portal websites. With the high development and application of the Internet industry, each item may have its own identification mark in the future, it needs to be transmitted to a background system for logical processing, different degrees and levels of data will be processed separately, all kinds of industry data need strong system backing support, and this can only be realized through cloud computing.

In some embodiments, the server can also be implemented as a node in a blockchain system.

It is to be understood that the implementation environment is only an exemplary example. The method for generating a palmprint sample provided by the present disclosure may be specifically applied to a computer device. The computer device may be a terminal or a server, and the method may be singly executed by the terminal or the server itself, and may also be realized through interaction between the terminal and the server.

In the method for generating a palmprint sample provided by the present disclosure, a first principal line positioning point and a second principal line positioning point are generated according to the palmprint principal line distribution rule, adjusting point data for controlling the principal line curving parameter is generated according to the palmprint principal line curving rule, a curve obtained by connecting the first principal line positioning point and the second principal line positioning point with a curving parameter controlled by the principal line adjusting point is used as the palmprint principal line, at least one palmprint sample including the palmprint principal line is generated, and the palmprint recognition model is trained by using the palmprint sample. Through the method, a plurality of palmprint samples are obtained through simulation according to the distribution condition of the palmprint principal line. Since the palmprint samples are determined in a data (first principal line positioning point, second principal line positioning point and adjusting point data) generation manner, the generated palmprint samples are in a great batch, and the upper limit of the quantity may be not set, so that the generated palmprint samples have higher diversity. During training on the palmprint recognition model based on the generated palmprint samples, the palmprint recognition model may be promoted to mine more texture internal rules and information not involved in the palmprint dataset to break through the limitation of the palmprint dataset and improve the robustness of the palmprint recognition model.

In combination with the above term explanation and application scenarios, the method for generating a palmprint sample provided by the present disclosure is illustrated. By taking the method applied to a server as an example, as shown in FIG. 2, the method includes the following step 210 to step 240.

Step 210: Generate positioning point data according to a palmprint principal line distribution rule.

The positioning point data includes first data corresponding to a first principal line positioning point and second data corresponding to a second principal line positioning point.

The palmprint principal line distribution rule is used for indicating a palmprint principal line distribution condition. In some embodiments, based on the analysis on the palmprint of a hand palm possessed by a great number of creatures per se, it is determined that the palmprint of the hand palm mainly includes a palmprint principal line and palmprint fine lines. The palmprint of the hand palm includes at least one of the following general features: (1) the distribution condition of the palmprint principal line is certain, and the distribution condition of the palmprint fine lines is random; and (2) the palmprint principal line has longer, thicker and deeper texture features in the palmprints, the palmprint fine lines have finer, shorter and shallower texture features through being compared with the palmprint principal line.

Figure 3:
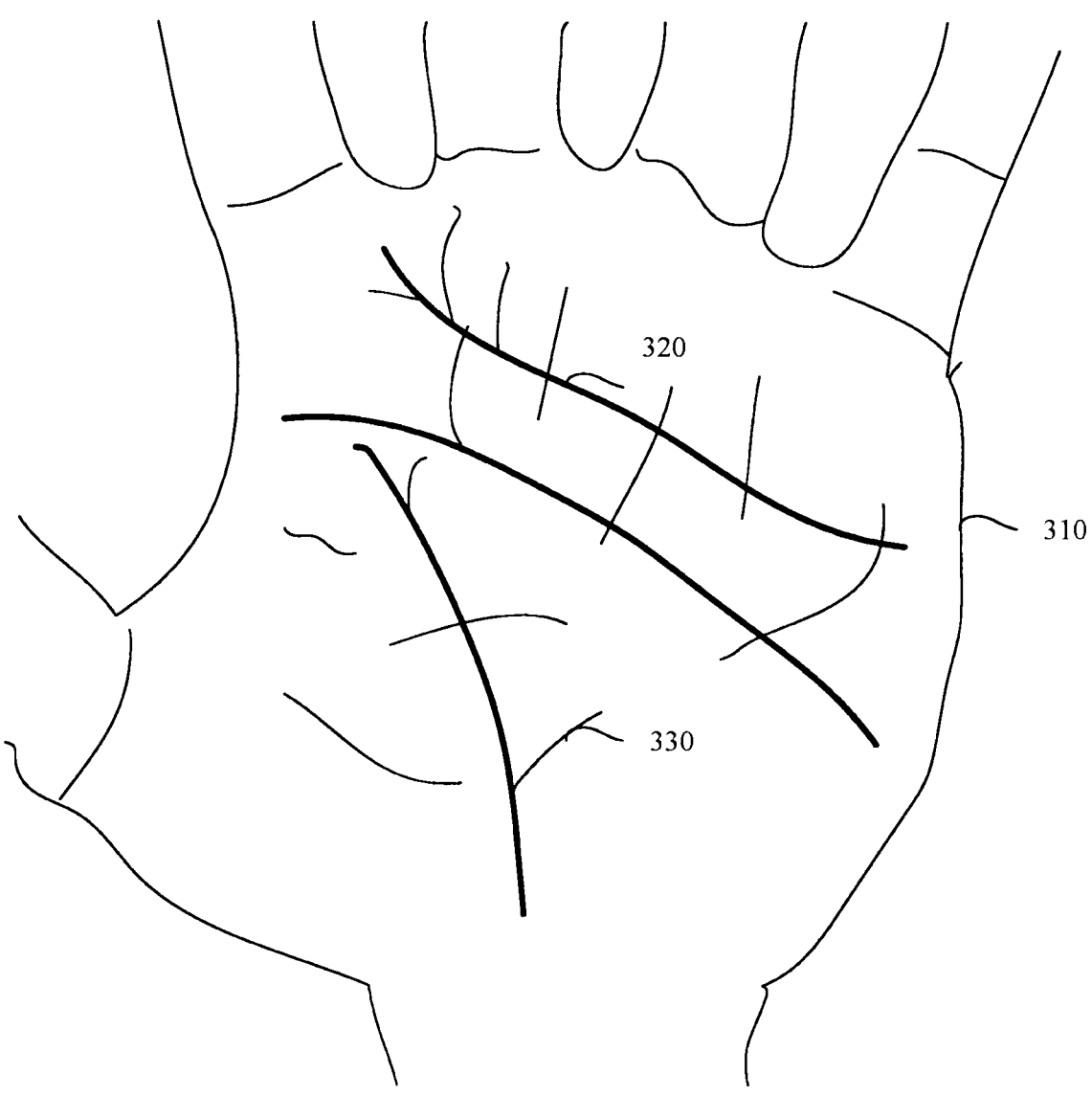
FIG. 3 is a schematic diagram of a palmprint of a hand palm according to an exemplary embodiment of the present disclosure.

In some embodiments, in response to that the palmprint is the palmprint of a hand palm, the distribution condition of the palmprint principal line is generally in a diagonal relationship. That is, a palmprint principal line distribution rule of the hand palm is a diagonal rule. Exemplarily, by taking the hand palm of a left hand as an example, the palmprint principal line generally starts from the top left corner and ends at the bottom right corner; and by taking the hand palm of a right hand as an example, the palmprint principal line generally starts from the top right corner and ends at the bottom left corner. As shown in FIG. 3, it is a schematic diagram of a palmprint of a left hand palm. A palm center region 310 includes principal lines 320 and fine lines 330. Thick lines are used for indicating the principal lines 320, and fine lines are used for indicating the fine lines 330. That is, the palm center region 310 includes three principal lines 320 and 13 fine lines 330.

In some embodiments, in response to that the palmprint is the palmprint of a foot sole, the distribution condition of the palmprint principal line is generally in various palmprint forms such as various kinds of herringbone palmprint, turtle-shaped palmprint and vertical palmprint. That is, a palmprint principal line distribution rule of the foot sole may be determined with reference to several common forms.

Figure 4:
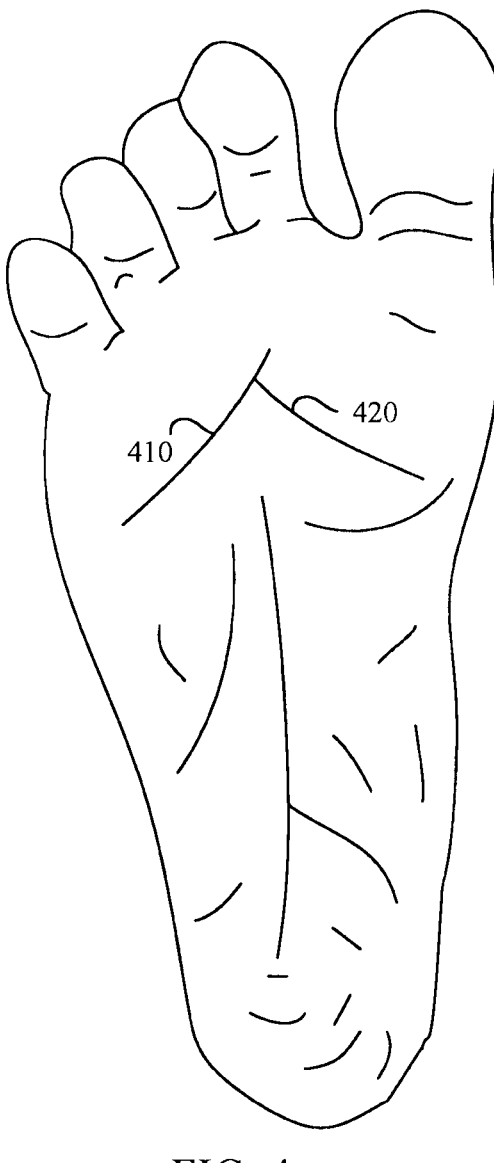
FIG. 4 is a schematic diagram of a palmprint of a foot sole according to an exemplary embodiment of the present disclosure.

Exemplarily, by taking the herringbone palmprint in the foot sole as an example, in response to that principal lines of the herringbone palmprint are two, the two principal lines generally start at the upper side and show a crossed or connection form. As shown in FIG. 4, it is a schematic diagram of a foot sole. The foot sole includes a herringbone palmprint. The herringbone palmprint includes two principal lines, the two principal lines are crossed at the upper side, the first principal line 410 ends at a bottom left corner, and the second principal line 420 ends at a bottom right corner. In some embodiments, in response to that the principal line of the herringbone palmprint is one, the principal line starts at the bottom left corner and ends at the bottom right corner. The principal line has a greater bending degree, and shows an upright herringbone shape or a reversed herringbone shape with a starting point and an ending point of the principal line; or the principal line starts at the upper side and ends at the lower side. The principal line has a greater bending degree, and shows a lateral placed herringbone shape with a starting point and an ending point of the principal line.

Exemplarily, by taking a vertical palmprint in the foot sole as an example, at least one principal line of the vertical palmprint is generally included, and the principal line generally starts at the upper side and ends at the lower side. The above is only an exemplary example. The embodiments of the present disclosure are not limited by the exemplary example.

In some embodiments, the positioning point data is used for indicating a fixing condition of the principal lines, and includes first data and second data. Based on the first data and the second data, the starting condition and the ending condition of the principal line are determined, and the distribution condition of the principal line is approximately determined. Exemplarily, the first data corresponds to the first principal line positioning point; and the second data corresponds to the second principal line positioning point.

In one embodiment, a starting point of the palmprint principal line is used as the first principal line positioning point, and the ending point of the palmprint principal line is used as the second principal line positioning point. Exemplarily, the generation of the positioning point data includes at least one of the following manners.

(1) Random Generation Manner

Exemplarily, in any one coordinate region, first data and second data are generated in a random generation manner. According to length limitation of the palmprint principal line, a line segment connected between the first principal line positioning point and the second principal line positioning point and the coordinate region are subjected to equal scaling, the first principal line positioning point corresponding to the first data and the second principal line positioning point corresponding to the second data are further determined.

Or, a palmprint principal line distribution range is determined according to the palmprint principal line distribution rule. For example, a hand palm of an adult is approximately 16 to 22 cm, the palmprint principal line is approximately distributed in the palm center region of the hand palm, and the palm center region of the hand palm of an adult is approximately 8 to 12 cm. Analysis is performed by taking the size of the palm center region of the hand palm of an adult as an example. A distribution region of the palmprint principal line is preset. The size of the distribution region may be a square region with an edge length of 8 cm, may also be a rectangular region with an edge length of 6 cm, may also be a rhombic region with a diagonal length of 10 cm, etc. In some embodiments, in a preset palmprint principal line distribution region, a first principal line positioning point corresponding to the first data and a second principal line positioning point corresponding to the second data are generated in a random generation manner.

(2) Generation Manner in Divided Region

In some embodiments, by taking the preset palmprint principal line distribution region as an example for illustration, in the palmprint principal line distribution region, the distribution region is subjected to region division to obtain a divided region, and in the divided region, first data and second data are generated in a random generation manner. Exemplarily, after the region division on the distribution region, two divided regions are obtained. A first principal line positioning point corresponding to the first data is generated in the first divided region, and a second principal line positioning point corresponding to the second data is generated in the second divided region.

In some embodiments, the distribution region is subjected to region division to obtain a plurality of divided regions. The region sum of the plurality of divided regions may be implemented as the total distribution region, and may also be implemented as the partial distribution region. That is, the divided region generating the positioning point data may include the total distribution region, may only include the partial distribution region, etc.

Figure 5:
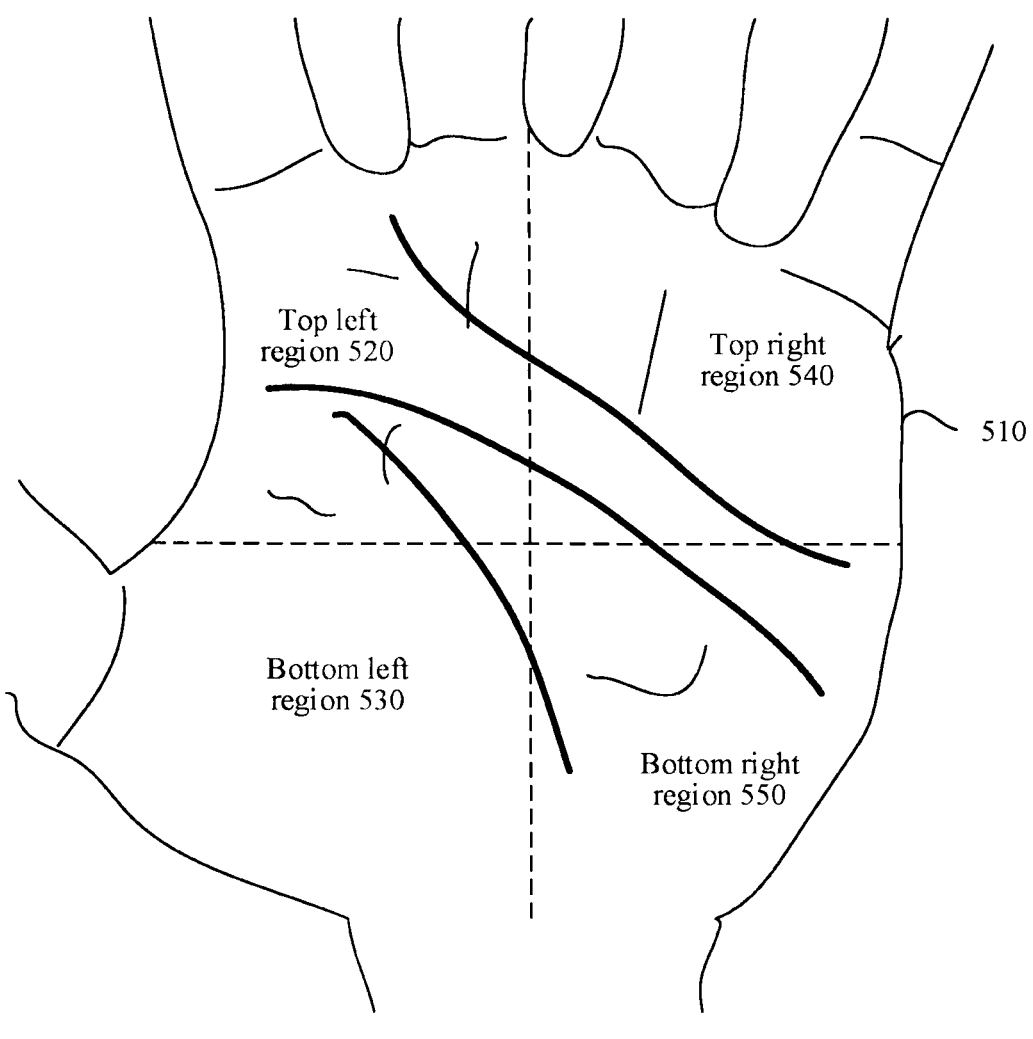
FIG. 5 is a schematic diagram of region division on a palmprint of a hand palm according to an exemplary embodiment of the present disclosure.

Exemplarily, as shown in FIG. 5, illustration is performed by taking a palm of a left hand as an example. A hand palm 510 of a left hand is used as a palmprint principal line distribution region. After the distribution region is divided, four divided regions are obtained, and are respectively a top left corner region 520, a bottom left corner region 530, a top right corner region 540 and a bottom right corner region 550. Under a general condition, in the hand palm of the left hand, a starting point of the palmprint principal line (first principal line positioning point) is positioned in the top left corner region 520, and an ending point of the palmprint principal line (second principal line positioning point) is positioned in the bottom right corner region 550, so that the top left corner region 520 is used as a divided region for generating the first data, and the bottom right corner region 550 is used as a divided region for generating the second data.

The above is only an exemplary example, and the embodiment of the present disclosure is not limited by the exemplary example.

Step 220: Generate adjusting point data according to a palmprint principal line curving rule.

A principal line adjusting point corresponding to the adjusting point data is configured to control a curving parameter of the principal line formed by the first principal line positioning point and the second principal line positioning point.

The palmprint principal line curving rule is used for indicating a curving parameter condition of the palmprint principal line. Exemplarily, the palmprint principal line is generally not a straight line segment, but is a curve with a certain curving parameter. After the first principal line positioning point and the second principal line positioning point are determined, the curving parameter of the principal line formed by the first principal line positioning point and the second principal line positioning point is adjusted through the generated principal line adjusting point.

In one embodiment, the adjusting point data is determined in a region between the first principal line positioning point and the second principal line positioning point according to the palmprint principal line curving rule.

Exemplarily, the geometric appearance of the palmprint is subjected to parametric description by using a Bezier curve. In some embodiments, at least one Bezier curve is used for describing the palmprint principal line of a hand palm.

The Bezier curve is a mathematical curve applied to a 2-Dimensional pattern application program. The Bezier curve consists of a line segment and a node. The node is a draggable fulcrum. The line segment is similar to a telescopic rubber band. During control on the shape of the line segment, the curving parameter of the line segment is controlled through the node to obtain a corresponding curve.

In some embodiments, by using any one palmprint principal line as an example for illustration, a two-order Bezier curve is used for forming the palmprint principal line. That is, three data (parameter points) are used in a 2-Dimensional (2D) plane to complete the determination on one palmprint principal line (Bezier curve). The three data are respectively the first data representing the first principal line positioning point, the principal line adjusting point and the second data representing the second principal line positioning point.

Figure 6:
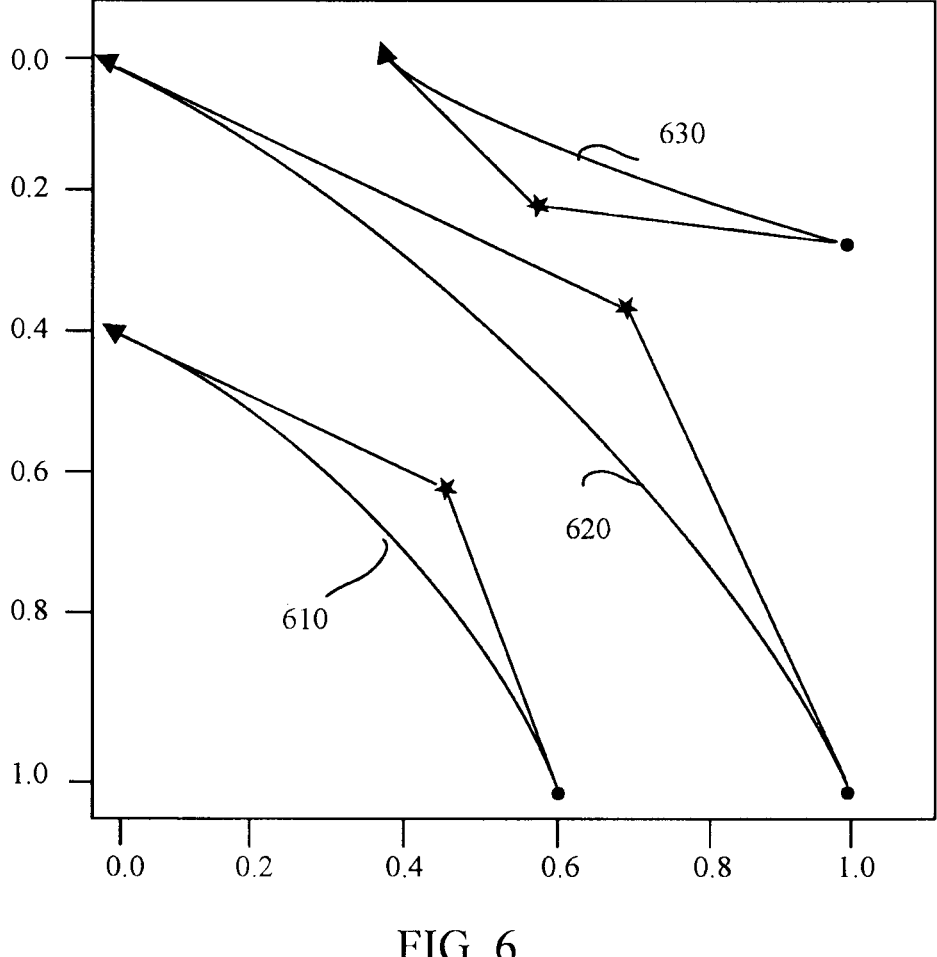
FIG. 6 is a schematic diagram of a Bezier curve according to an exemplary embodiment of the present disclosure.

In some embodiments, as shown in FIG. 6, it is a schematic diagram of determining the palmprint principal line by using a Bezier curve method. A region defined by a horizontal axis and a vertical axis is a generation region of the palmprint principal line. Numbers marked on the horizontal axis and the vertical axis are used for assisting the coordinate position determination of the three data. In the schematic diagram, three palmprint principal lines are included. Each of the palmprint principal lines is determined through the first data, the principal line adjusting point and the second data. "Inverted triangle symbols" are used for indicating the first principal line positioning points corresponding to the first data. "Start symbols" are used for indicating the principal line adjusting points. "Dot symbols" are used for indicating the second principal line positioning points corresponding to the second data.

Exemplarily, the first principal line positioning points corresponding to the first data and the second principal line positioning points corresponding to the second data are firstly generated. Then, the principal line adjusting points are generated between the first principal line positioning points and the second principal line positioning points. In some embodiments, based on a limitation relationship of a coordinate region between the first principal line positioning points and the second principal line positioning points, the principal line adjusting points are generated.

For example, the coordinate of the first principal line positioning point (start point) of the palmprint principal line 610 is (0.0, 0.4), the coordinate of the principal line adjusting point (control point) is (0.5, 0.6), and the coordinate of the second principal line positioning point (end point) is (0.6, 1.0). The coordinate of the first principal line positioning point of the palmprint principal line 620 is (0.0, 0.0), the coordinate of the principal line adjusting point is (0.7, 0.3), and the coordinate of the second principal line positioning point is (1.0, 1.0). The coordinate of the first principal line positioning point of the palmprint principal line 630 is (0.4, 0.0), the coordinate of the principal line adjusting point is (0.6, 0.2), and the coordinate of the second principal line positioning point is (1.0, 0.3).

The above is only an exemplary example, and the embodiment of the present disclosure is not limited by the exemplary example.

Step 230: Generate a palmprint principal line based on first data, second data and adjusting point data.

The palmprint principal line is a curve formed by connecting the first principal line positioning point and the second principal line positioning point with a curving parameter controlled by the principal line adjusting point.

Exemplarily, as shown in FIG. 6, the palmprint principal line 610 is obtained by connecting the first principal line positioning point and the second principal line positioning point using a curve with a curving parameter controlled by the principal line adjusting point, so that the palmprint principal line 610 is an arc-shaped curve protruded to a great degree in an upward direction. The palmprint principal line 620 is obtained by connecting the first principal line positioning point and the second principal line positioning point using a curve with a curving parameter controlled by the principal line adjusting point, so that the palmprint principal line 620 is an arc-shaped curve protruded to a small degree in an upward direction. The palmprint principal line 630 is obtained by connecting the first principal line positioning point and the second principal line positioning point using a curve with a curving parameter controlled by the principal line adjusting point, so that the palmprint principal line 630 is an arc-shaped curve recessed in a downward direction.

Step 240: Generate at least one palmprint sample including the palmprint principal line.

The palmprint sample is used for training a palmprint recognition model, and the palmprint recognition model is used for palmprint recognition.

Exemplarily, at least one palmprint principal line is included in one palmprint sample. For example, through observation based on the palmprint data possessed by creatures per se, the quantity of the palmprint principal lines is generally 2 to 5. That is, when using the palmprint condition possessed by creatures per se as a generation standard, generally, two palmprint principal lines are included in one palmprint sample; or three palmprint principal lines are included in one palmprint sample; or four palmprint principal lines are included in one palmprint sample; or five palmprint principal lines are included in one palmprint sample.

In one embodiment, based on the method of generating the palmprint principal lines through the positioning point data and the principal line adjusting point, after the at least one palmprint principal line is obtained, a plurality of palmprint principal lines are generated by using the same method for generating a palmprint principal line.

In some embodiments, the positioning point data corresponding to a plurality of palmprint principal lines may be the same and may be different. For example, the first principal line positioning point corresponding to each of the palmprint principal line 1 and the palmprint principal line 2 is a point A, but the second principal line positioning point of the palmprint principal line 1 is a point B, and the second principal line positioning point of the palmprint principal line 2 is a point C. Or, the second principal line positioning point corresponding to each of the palmprint principal line 1 and the palmprint principal line 2 is a point C, but the first principal line positioning point of the palmprint principal line 1 is a point A, and the first principal line positioning point of the palmprint principal line 2 is a point B. Or, the first principal line positioning point corresponding to each of the palmprint principal line 1 and the palmprint principal line 2 is a point A, the second principal line positioning point is a point B, but the principal line adjusting point of the palmprint principal line 1 is a point C, the principal line adjusting point of the palmprint principal line 2 is a point D, etc. Exemplarily, 2 to 5 palmprint principal lines are randomly selected from a plurality of generated palmprint principal lines to obtain a palmprint sample.

In one embodiment, a palmprint sample including three palmprint principal lines is taken as an example for illustration. In the palmprint sample, besides the three palmprint principal lines are included, palmprint fine lines are also included. The palmprint fine lines have the shorter and shallower texture features through being compared with the palmprint principal lines. Exemplarily, a generation process of the palmprint fine lines is illustrated.

In some embodiments, at least two palmprint fine line positioning points are determined; and the palmprint fine lines are generated based on the at least two palmprint fine line positioning points.

The palmprint fine line positioning points are used for determining a fine line generation range. Exemplarily, at least two palmprint fine line positioning points are generated according to a palmprint fine line distribution rule.

In some embodiments, the palmprint fine line distribution rule includes various distribution rules such as a palmprint fine line length rule, a palmprint fine line thickness rule and a palmprint fine line density rule.

Exemplarily, the palmprint fine line length rule is used for indicating the length limitation of the palmprint fine lines. For example, the length of the palmprint fine lines is smaller than the shortest palmprint principal line in a plurality of palmprint principal lines; or the length of the palmprint fine lines is smaller than a preset length threshold value (such as 3 cm), etc.

Exemplarily, the palmprint fine line thickness rule is used for indicating the thickness limitation of the palmprint fine lines. For example, the thickness of the palmprint fine lines is smaller than the thinnest palmprint principal line in a plurality of palmprint principal lines; or the thickness of the palmprint fine lines is smaller than a preset thickness threshold value (such as 1 mm), etc.

Exemplarily, the palmprint fine line density rule is used for indicating the mutual distribution condition of at least two palmprint fine lines in the palmprint generation region. For example, in a region X (preset region) predetermined in the palmprint generation region, at least 3 palmprint fine lines are stipulated to be generated; or the palmprint generation region is divided into a plurality of sub regions with a unit length (1 cm), and each sub region is stipulated to have at least two palmprint fine lines, etc.

The various above distribution rules may be singly applied, and may be applied to a combined manner. For example, the palmprint fine lines are determined only by using the length rule; or the palmprint fine lines are determined by comprehensively considering the length rule, the thickness rule and the density rule, etc. The above is only an exemplary example, and the embodiment of the present disclosure is not limited by the exemplary example.

In some embodiments, in palmprint distribution, the distribution of the palmprint fine lines is dispersed and random, based on the distribution rule of the palmprint fine lines and the palmprint distribution condition of the palmprint data stored in the palmprint database, at least one of the following methods is adopted, and at least one palmprint fine line is generated in the palmprint generation region.

(1) After at least one palmprint fine line positioning point is determined, based on the distribution rule of the palmprint fine lines, the rest at least one palmprint fine line positioning point is determined.

Exemplarily, a preset length threshold value of the palmprint fine lines is predetermined to be 3 cm, and a preset thickness threshold value of the palmprint fine lines is predetermined to be 1 mm. In the palmprint generation region, one palmprint fine line positioning point is randomly generated, within the preset length threshold value and the preset thickness threshold value of the palmprint fine lines, at least one rest palmprint fine line positioning point is determined to obtain at least two palmprint fine line positioning points. In some embodiments, by using the at least one rest palmprint fine line positioning point as the reference, within the preset length threshold value and the preset thickness threshold value of the palmprint fine lines, rest palmprint fine line positioning points are determined, etc.

(2) Based on the distribution rule of the palmprint fine lines, at least two palmprint fine line positioning points are randomly determined.

Exemplarily, in the palmprint generation region, based on the palmprint fine line distribution rule, at least two points are randomly generated to be used as at least two palmprint fine line positioning points; or, after the palmprint generation region is divided, at least two sub regions are obtained, and the palmprint fine line positioning points used for generating the palmprint fine lines are determined in the sub regions.

In some embodiments, after the at least two palmprint fine line positioning points are obtained, at least one of the following manners of obtaining the palmprint fine lines is obtained.

1. The at least two palmprint fine line positioning points are connected to obtain the palmprint fine lines.

Exemplarily, after the generated at least two palmprint fine line positioning points are obtained, any two palmprint fine line positioning points are connected to obtain palmprint fine lines in a line segment form; or, after a plurality of random palmprint fine line positioning points are connected, palmprint fine lines in irregular line segment shapes are obtained; or, under the condition of considering that the length of the fine lines is short, a plurality of (two or more) random palmprint fine line positioning points are used as one fine line positioning point group, palmprint fine lines are obtained in a certain length range, etc.

2. At least one palmprint sample is determined according to the palmprint fine line adjusting point generated according to the at least two palmprint fine line positioning points.

In one embodiment, the palmprint fine line adjusting points are determined based on the at least two palmprint fine line positioning points.

The palmprint fine line adjusting points are configured to control the curving parameter between the at least two palmprint fine line positioning points. Exemplarily, during generation of the palmprint fine lines, the palmprint fine lines are determined by using a Bezier curve method. That is, after the at least two palmprint fine line positioning points are generated, the palmprint fine line adjusting points for adjusting the curving parameter of the line segment between the at least two palmprint fine line positioning points is determined. Through a position moving process on the palmprint fine line adjusting points, different palmprint fine lines, such as different palmprint fine lines in an arc form with great curving parameter or different palmprint fine lines in an irregular curve form at a small bending degree, corresponding to a condition that the palmprint fine line adjusting points in different positions are obtained.

In one embodiment, the palmprint fine lines are determined based on the at least two palmprint fine line positioning points and the palmprint fine line adjusting point in the preset palmprint fine line quantity range.

In some embodiments, in order that the palmprint condition in the generated palmprint sample is similar to the palmprint condition of creatures, the quantities of the palmprint principal lines and the palmprint fine lines are preset. Exemplarily, by taking an observation result in a certain palm center region as an example for illustration, for the palmprint conditions of creatures, in the palm center region, the quantity of the palmprint principal lines is 2 to 5, and the quantity of the palmprint fine lines is 5 to 15. For example, the quantity of the palmprint principal lines is preset to be in a range of 2 to 5, and the quantity of the palmprint fine lines is preset to be in a range of 5 to 15. During determination of the palmprint principal lines, the quantity of the palmprint principal lines is controlled to be within a quantity range of 2 to 5, and the palmprint principal lines of at least four conditions are obtained. During determination of the palmprint fine lines, the quantity of the palmprint fine lines is to be within a quantity range of 5 to 15 to obtain the palmprint fine lines of at most eleven conditions.

In one embodiment, the at least one palmprint sample including the palmprint fine lines and the palmprint principal lines is generated within the preset palmprint quantity range.

The palmprint quantity range includes at least one of the palmprint principal line quantity range and the preset palmprint fine line quantity range. In some embodiments, the palmprint sample includes a certain quantity of palmprint principal lines and palmprint fine lines. In response to that the palmprint sample is obtained based on the palmprint condition of creatures, the quantities of the palmprint principal lines and the palmprint fine lines in the palmprint samples are similar to the quantities of the palmprint principal lines and the palmprint fine lines of creatures.

Exemplarily, in a certain palm center region, in the palm center region, the quantity of the palmprint principal lines is controlled to be 2 to 5, the quantity of the palmprint fine lines is controlled to be 5 to 15, and a plurality of palmprint samples are obtained. For example, the quantity of the palmprint principal lines of the first palmprint sample is 3, the quantity of the palmprint fine lines is 12; the quantity of the palmprint principal lines of the second palmprint sample is 5, the quantity of the palmprint fine lines is 10; and the quantity of the palmprint principal lines of the third palmprint sample is 4, the quantity of the palmprint fine lines is 5.

In one embodiment, the generated palmprint sample only includes palmprint principal lines. Different palmprint samples are determined according to the trends of different palmprint principal lines and the distribution relationship among a plurality of palmprint principal lines. The trend of the palmprint principal lines is used for indicating the relationship among the first principal line positioning point, the principal line adjusting point and the second principal line positioning point. The distribution relationship among the palmprint principal lines is used for indicating the relationship (such as a crossed relationship, a parallel relationship and a distance relationship) among a plurality of palmprint principal lines belonging to the same palmprint sample.

In some embodiments, by considering that the finally imaged palmprint on different photos of the same hand palm may generate tiny differences due to factors such as palm postures and shooting angles in the palmprint distribution conditions, exemplarily, tiny disturbance is added onto the generated palmprint sample, and the palmprint sample after tiny disturbance addition is regarded as the palmprint data corresponding to the same identity document (ID). That is, a plurality of target samples obtained after disturbing the palmprint sample in a target disturbing interval are regarded as the palmprint data corresponding to the same ID.

In some embodiments, the disturbing interval of tiny disturbance is predetermined, and the disturbance performed on the palmprint sample in the disturbing interval is used as the tiny disturbance. The disturbance performed on the palmprint sample includes at least one of the following implementations.

(1) The palmprint principal line in the palmprint sample is disturbed.

The palmprint principal line in the palmprint sample is a smooth curve formed by connecting the first principal line positioning point and the second principal line positioning point with a curving parameter controlled by the principal line adjusting point. During disturbance on the palmprint principal line in the palmprint sample, the disturbance includes the disturbance on any one point of the first principal line positioning point, the principal line adjusting point and the second principal line positioning point of the palmprint principal line in the disturbing interval; also includes the disturbance simultaneously performed on any two points of the first principal line positioning point, the principal line adjusting point and the second principal line positioning point of the palmprint principal line in the disturbing interval; and also includes the disturbance simultaneously performed on the first principal line positioning point, the principal line adjusting point and the second principal line positioning point of the palmprint principal line in the disturbing interval, etc.

In some embodiments, the preset disturbing interval includes a disturbing interval X of the first principal line positioning point, a disturbing interval Y of the principal line adjusting point and a disturbing interval Z of the second principal line positioning point, and the preset disturbing ranges of the disturbing interval X, the disturbing interval Y and the disturbing interval Z may be identical or different.

(2) The palmprint fine line in the palmprint sample is disturbed.

The palmprint fine line includes a straight line formed by two palmprint fine line positioning points, and also includes a curve formed by the palmprint fine line positioning point and the fine line adjusting point. In response to that the palmprint fine line is the straight line formed by the two palmprint fine line positioning points, a process of disturbing the palmprint fine lines in the palmprint sample is implemented as a process of disturbing any one point of the palmprint fine line positioning points in the palmprint fine lines or simultaneously disturbing the palmprint fine line positioning points in the palmprint fine lines. In response to that the palmprint fine line is the curve formed by the palmprint fine line positioning point and the fine line adjusting point, a process of disturbing the palmprint fine lines in the palmprint sample is implemented as a process of disturbing any one point of the palmprint fine line positioning points in the palmprint fine lines in the disturbing interval, or disturbing the fine line adjusting point in the palmprint fine lines in the disturbing interval, or simultaneously disturbing the palmprint fine line positioning point and the fine line adjusting point in the palmprint fine lines in the disturbing interval.

(3) The palmprint principal line and the palmprint fine line in the palmprint sample are disturbed.

The palmprint principal line in the palmprint sample is a smooth curve formed by connecting the first principal line positioning point and the second principal line positioning point with a curving parameter controlled by the principal line adjusting point, and the palmprint fine line includes a straight line formed by two palmprint fine line positioning points, and also includes a curve formed by the palmprint fine line positioning point and the palmprint fine line adjusting point.

In response to that the palmprint principal line and the palmprint fine line in the palmprint sample are disturbed, the process is implemented into a process of disturbing any one point or a plurality of points of the palmprint fine line positioning points and the fine line adjusting points of the palmprint fine lines during disturbing any one point or a plurality of points in the first principal line positioning point, the principal line adjusting point and the second principal line positioning point of the palmprint principal line in the disturbing interval.

In some embodiments, based on the above disturbing interval range, in a process of disturbing the palmprint principal line and the palmprint fine lines, disturbed palmprint samples corresponding to a plurality of palmprint samples is obtained, and a plurality of disturbed palmprint samples and undisturbed palmprint samples are regarded as the palmprint data corresponding to the same ID.

For example, in a disturbing interval range, a palmprint sample A is subjected to tiny disturbance by the above disturbing method to obtain a palmprint sample B and a palmprint sample C after disturbing the palmprint principal lines of the palmprint sample A, and a palmprint sample D after disturbing the palmprint principal line and palmprint fine lines of the palmprint sample A, and the palmprint sample A, the palmprint sample B, the palmprint sample C and the palmprint sample D are used as the palmprint data corresponding to the same ID.

The above is only an exemplary example. The embodiments of the present disclosure are not limited by the exemplary example.

Based on the above, a first principal line positioning point and a second principal line positioning point are generated according to the palmprint principal line distribution rule, adjusting point data for controlling the principal line curving parameter is generated according to the palmprint principal line curving rule, a curve obtained by connecting the first principal line positioning point and the second principal line positioning point with a curving parameter controlled by the principal line adjusting point is used as the palmprint principal line, at least one palmprint sample including the palmprint principal line is generated, and the palmprint recognition model is trained by using the palmprint sample. Through the method, a plurality of palmprint samples are obtained through simulation according to the distribution condition of the palmprint principal line. Since the palmprint samples are determined in a data (first principal line positioning point, second principal line positioning point and adjusting point data) generation manner, the generated palmprint samples are in a great batch, and the upper limit of the quantity may be not set, so that the generated palmprint samples have higher diversity. During training on the palmprint recognition model based on the generated palmprint samples, the palmprint recognition model may be promoted to mine more texture internal rules and information not involved in the palmprint dataset to break through the limitation of the palmprint dataset and improve the robustness of the palmprint recognition model.

In one embodiment, as shown in FIG. 7, a process of generating the first principal line positioning point, the second principal line positioning point and the principal line adjusting point according to the palmprint principal line distribution rule and the palmprint principal line curving rule may also be implemented as the following step 710 and step 770.

Step 710: Determine a first region and a second region corresponding to a trend of the palmprint principal line according to the palmprint principal line distribution rule.

Exemplarily, by taking the palmprint of a hand palm as an example for illustration, there is a certain rule for the distribution of the palmprint principal line in the palmprint of the hand palm. As shown in FIG. 3, it is a schematic diagram of a distribution condition of palmprint of a hand palm. Each of palmprint principle lines 320 is approximately shown in a showing form that a first principal line positioning point is at the top left corner, and a second principal line positioning point is at the bottom right corner; or the bottom right corner is regarded as the first principal line positioning point of the palmprint principal line 320, and the top left corner is regarded as the second principal line positioning point of the palmprint principal line 320. In some embodiments, the palmprint principal line is analyzed in a manner of using the top left corner as the first principal line positioning point and the bottom right corner as the second principal line positioning point.

In one embodiment, a palmprint generation region is determined according to the palmprint principal line distribution rule.

The palmprint generation region is used for framing a distribution range of the palmprint principal line.

Exemplarily, the palmprint generation region is determined in a random generation manner. For example, a rectangular region with a unit length (1 cm) as an edge length is generated; or a region in an irregular shape with a preset length being a maximum diagonal line is generated, etc.

Figure 8:
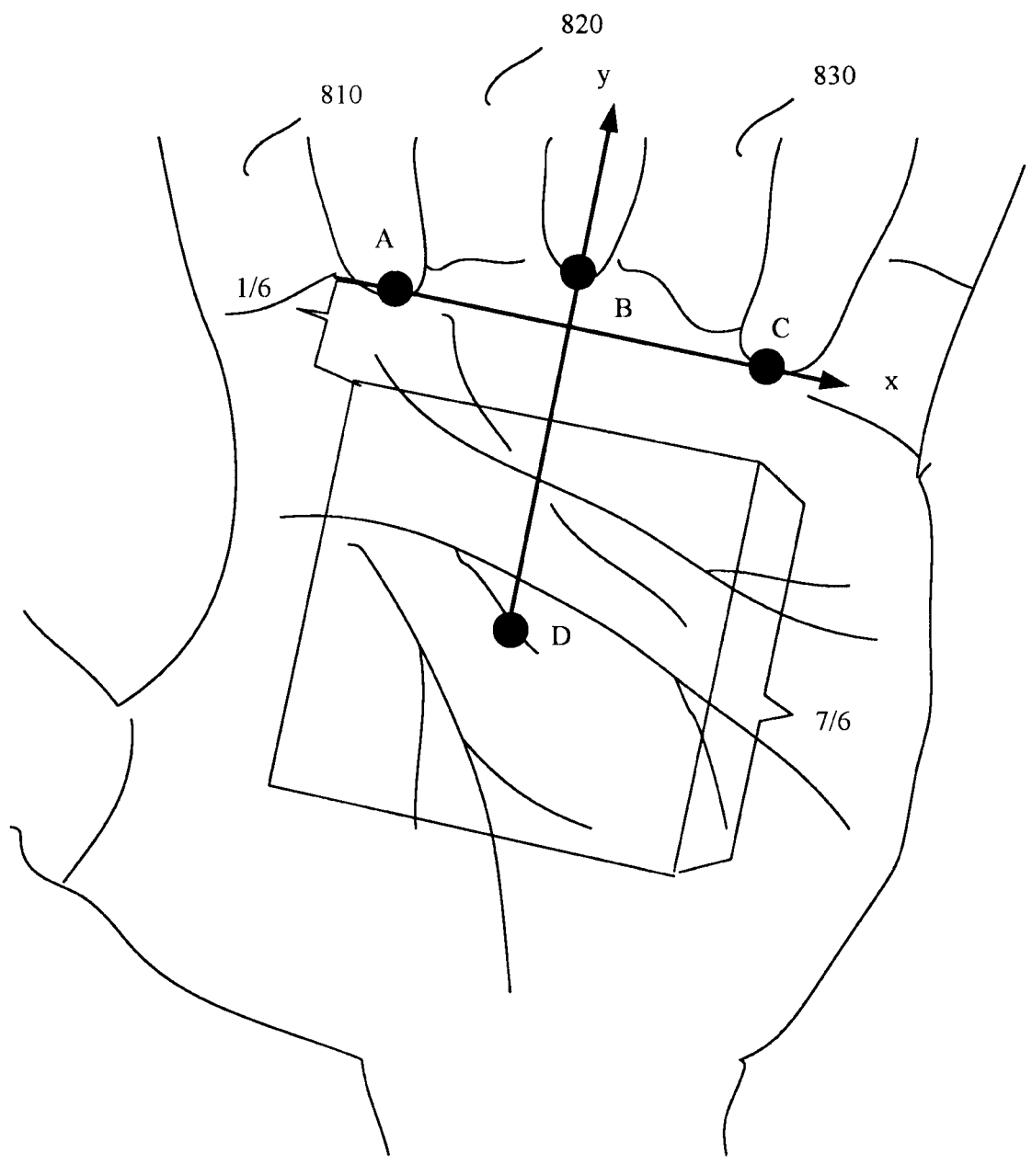
FIG. 8 is a schematic diagram of a determined region of interest according to an exemplary embodiment of the present disclosure.

In some embodiments, the palmprint generation region may also be determined according to the palmprint distribution condition of the palmprint of the hand palm. Exemplarily, as shown in FIG. 8, and it is a schematic diagram of palmprint of a hand palm. By taking the palmprint distribution condition of the palmprint of the hand palm as shown in FIG. 8 as an example for illustration, a process of determining the palmprint generation region according to the palmprint principal line distribution rule of the hand palm includes the following process.

(1) Finger Seam Key Point Positioning

In some embodiments, finger seams of fingers are detected by using a target detector, a key point A between an index finger 810 and a middle finger 820, a key point B between the middle finger 820 and a ring finger 830, and a key point C between the ring finger 830 and a little finger are determined, and the key point A, the key point B and the key point C are determined as three finger seam key points to be used as positioning results of the finger seam key point positioning. Exemplarily, during detection on the finger seams of the fingers by using the target detector, the mid-point position between two thumbs is used as a finger seam key point position.

(2) Local Coordinate System Determination

In one embodiment, after the finger seam key point position is determined according to the finger seam, a local coordinate system is built according to the key point.

Exemplarily, the key point A between the index finger 810 and the middle finger 820, the key point C between the ring finger 830 and the little finger are connected, and a straight line obtained through connection is determined as an abscissa axis (axis x) of the local coordinate system. The key point B between the middle finger 820 and the ring finger 830 is used as an original point of the local coordinate system, and a vertical axis (axis y) perpendicular to the abscissa axis is determined, so that the local coordinate system built by the key point A, the key point B and the key point C is obtained.

In some embodiments, a center point D of the palmprint generation region is determined in a negative direction of the vertical axis in the local coordinate system. A manner of determining the position of the center point D of the palm-print generation region includes: determination according to a width and a length of the palm center of the hand palm; or determination according to a distance between the key points, etc.

Exemplarily, in response to that the position of the center point D of the palmprint generation region is determined according to the width and the length of the palm center of the hand palm, the determination is performed by using the width of the palm center of the hand palm and the length of the palm center of the hand palm as the standard. For example, a rectangular shape is built by using the width of the palm center of the hand palm and the length of the palm center of the hand palm as the edge lengths. The position of the center point D of the palmprint generation region is determined based on the intersection point of the diagonal lines in the rectangular shape.

Exemplarily, during determination on the position of the center point D of the palmprint generation region according to the distance between the key points, a distance BD between the key point B and the center point D of the palmprint generation region, and a distance AC between the key point A and the key point C are determined at first; and then, the position of the center point D of the palmprint generation region is determined according to the length relationship between the distance BD and the distance AC. For example, by setting that the distance BD is 1.5 times of the distance AC, the center point D of the palmprint gen-eration region is determined according to the distance AC and the built local coordinate system.

(3) Palmprint Generation Region Extraction

In some embodiments, after the center point D of the palmprint generation region is determined, the palmprint generation region is determined according to the midpoint of the palmprint generation region. For example, a rectangular region with a certain edge length is built by using the center point D of the palmprint generation region as a center, and the rectangular region is used as the palmprint generation region; or an irregular palm-shaped region is built by using the center point D of the palmprint generation region as a gravity center, and the irregular palm-shaped region is used as the palmprint generation region, etc.

The center point D of the palmprint generation region is regarded as the center, and the condition of regarding the built rectangular region as the palmprint generation region is used as an example for illustration. The edge length of the rectangular region is determined according to the length relationship between the key points.

Exemplarily, after the distance AC between the key point A and the key point C is determined, the distance AC is used as the edge length of the palmprint generation region; or 7/6 times of the distance AC is used as the edge length of the palmprint generation region, etc.

Or, after the distance AB between the key point A and the key point B is determined, the 2 times of the distance AB is used as the edge length of the palmprint generation region, etc.

In some embodiments, the palmprint generation region may also be called a region of interest (ROI). That is, the palmprint generation region is a region which receives close attention in a palmprint generation process, and the palm-print generation process is performed in this region.

Exemplarily, there is a certain rule for the trend of the palmprint principal line. For example, the trend of the palmprint principal line in the palmprint of a hand palm is from the top left corner to the bottom right corner. After the palmprint generation region is obtained, based on the trend of the palmprint principal line, a first region and a second region which correspond to each other are determined in the palmprint generation region, and a starting palmprint posi-tioning point and an ending palmprint positioning point are generated.

In one embodiment, a first vertex and a second vertex in a diagonal relationship are determined in the palmprint generation region.

Figure 9:
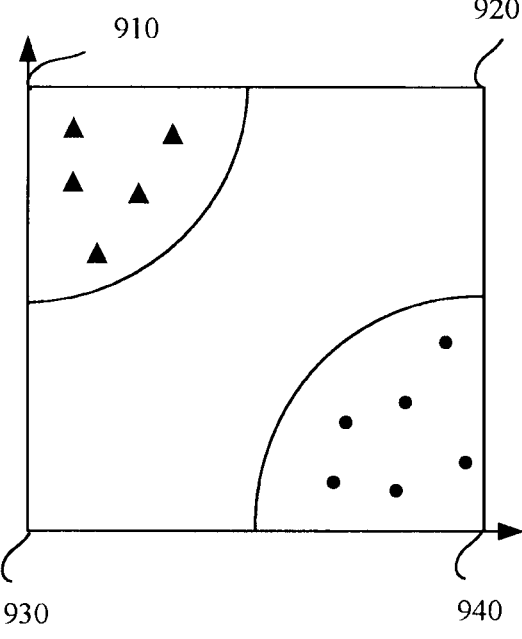
FIG. 9 is a schematic diagram of a first region and a second region according to an exemplary embodiment of the present disclosure.

Exemplarily, as shown in FIG. 9, the palmprint generation region is a rectangular region, vertexes in a diagonal rela-tionship in the rectangular region are respectively deter-mined as a first vertex and a second vertex. The vertexes in the diagonal relationship include a vertex 910 and a vertex 940; and a vertex 920 and a vertex 930. Exemplarily, in response to that the vertex 910 is regarded as the first vertex, the vertex 940 is the second vertex; and in response to that the vertex 920 is regarded as the first vertex, the vertex 930 is the second vertex, etc. Exemplarily, through analysis on the palmprint distribution of a left hand palm, the palmprint of the left hand palm generally has a palmprint trend from the top left corner to the bottom right corner. That is, in response to that the palmprint generation region is a rect-angular region as shown in FIG. 9, the trend of the palmprint principal line points from the vertex 910 (the first vertex) to the vertex 940 (the second vertex).

In one embodiment, the first region is determined in the palmprint generation region by using the first vertex as a center and a first preset length as a radius.

Exemplarily, after the first vertex is determined, the first region determined based on the first vertex is a fan-shaped region. A circle center point of the fan-shaped region is the first vertex, and the radius of the fan-shaped region is the first present length. Or, the fan-shaped region is regarded as a ¼ circular region. The center point of the circular region is the first vertex, and the radius of the circular region is the first preset length.

In some embodiments, the first preset length may be a preset fixed value, and may also be a value determined based on the palmprint generation region.

For example, the first preset length is a preset fixed value, during determination of the first region based on the first vertex, the first region is determined in the palmprint generation region by using the first vertex as the center and the preset fixed value as the radius; or, the first preset length is a value determined based on the palmprint generation region (for example, the edge length in the palmprint generation region is used as the diameter; or, a half of the edge length in the palmprint generation region is used as the diameter, etc.), and during determination of the first region based on the first vertex, the first region is determined in the palmprint generation region by using the first vertex as the center and the value determined based on the palmprint generation region as the radius, etc.

Exemplarily, in response to that the palmprint generation region is a square region of a unit length, as shown in FIG. 9, the circle center point is a third vertex, and for the first principal line positioning point, the coordinate of the first principal line positioning point is defined as follows:

$$x^2 + (y-1)^2 \le \frac{1}{4}, x \in \left[0, \frac{1}{2}\right], y \in \left[\frac{1}{2}, 1\right]$$

In the formula, x is used for indicating an abscissa axis coordinate, and y is used for indicating a vertical axis coordinate.

In one embodiment, the second region is determined in the palmprint generation region by using the second vertex as a center and a second preset length as a radius.

In some embodiments, a process of determining the second region according to the second vertex is similar to a process of determining the first region according to the first vertex. Exemplarily, the values of the second preset length and the first preset length may be identical or different.

For example, as shown in FIG. 9, the palmprint generation region is a square region. In response to that the value of the second preset length is the same as the value of the first preset length, the second region formed by using the second vertex as the center and the second preset length as the radius and the first region formed by using the first vertex as the center and the first preset length as the radius are both fan-shaped regions, and the first region and the second region are regions in the same shapes.

Exemplarily, in response to that the palmprint generation region is a square region of a unit length, as shown in FIG. 9, the circle center point is a third vertex, and for the second principal line positioning point, the coordinate of the second principal line positioning point is defined as follows:

$$(x-1)^2 + y^2 \le \frac{1}{4}, x \in \left[\frac{1}{2}, 1\right], y \in \left[0, \frac{1}{2}\right]$$

In the formula, x is used for indicating an abscissa axis coordinate, and y is used for indicating a vertical axis coordinate.

Or, in response to that the value of the second preset length is different from the value of the first preset length, the second region formed by using the second vertex as the center and the second preset length as the radius and the first region formed by using the first vertex as the center and the first preset length as the radius have different region shapes.

For example, in response to that the palmprint generation region is a square region, and the length value of the second preset length is greater, but the length value of the first preset length is smaller, the second region corresponding to the second preset length is greater than the first region corresponding to the first preset length.

The above is only an exemplary example. The embodiments of the present disclosure are not limited by the exemplary example.

Step 720: Determine the first data corresponding to the first principal line positioning point in the first region.

In some embodiments, after the first region is determined, the first data corresponding to the first principal line positioning point is determined in the first region in a random selection manner.

The random selection is used for indicating an equiprobable selection manner. Exemplarily, in the first region, the coordinate corresponding to a certain coordinate point is randomly used as the coordinate of the first principal line positioning point in an equiprobable manner to realize the process of generating the first data.

In some embodiments, the first data corresponding to the first principal line positioning point is determined in the first region in a non-equiprobable manner according to the palmprint principal line generation rule. For example, after the analysis on the palmprint distribution condition, it is discovered that the palmprint principal line of the palmprint mostly uses a point M as a starting point, during the determination of the first data in the first region, the probability of setting the point M to be used as the first principal line positioning point is higher, and the process of selecting the first data in a non-equiprobable manner is further realized.

Step 730: Determine the second data corresponding to the second principal line positioning point in the second region.

In some embodiments, after the second region is determined, the second data corresponding to the first principal line positioning point is determined in the second region in a random selection manner.

The random selection is used for indicating an equiprobable selection manner. Exemplarily, in the second region, the coordinate corresponding to a certain coordinate point is randomly used as the coordinate of the second principal line positioning point in an equiprobable manner to realize the process of generating the second data.

In some embodiments, the second data corresponding to the second principal line positioning point is determined in the second region in a non-equiprobable manner according to the palmprint principal line generation rule. For example, after the analysis on the palmprint distribution condition of the palmprint, it is discovered that the palmprint principal line of the palmprint mostly uses a point N and a point L as ending points, during the determination of the second data in the second region, the probability of setting the point N and the point L to be used as the second principal line positioning points is higher, and the process of selecting the second data in a non-equiprobable manner is further realized.

The above is only an exemplary example. The embodiments of the present disclosure are not limited by the exemplary example.

Step 740: Determine a third region based on a position relationship between the first principal line positioning point and the second principal line positioning point according to the palmprint principal line curving rule.

Exemplarily, the palmprint principal line curving rule is used for indicating a bending condition of the palmprint principal line. For example, the curving parameter of the palmprint principal line of the palmprint is smaller; and the bending degree of the palmprint principal line of the palmprint is smoother, etc.

In some embodiments, a third region used for generating the principal line adjusting point based on a position relationship between the first principal line positioning point and the second principal line positioning point is determined.

In one embodiment, the first principal line positioning point and the second principal line positioning point are connected to obtain a target line segment.

Figure 10:
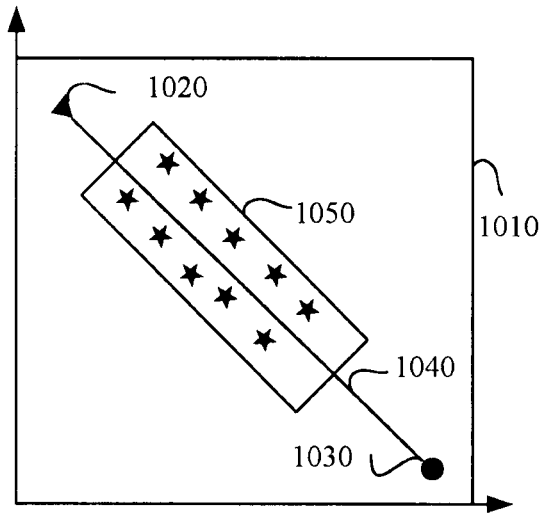
FIG. 10 is a schematic diagram of a third region according to an exemplary embodiment of the present disclosure.

Exemplarily, as shown in FIG. 10, in a palmprint generation region 1010, a first principal line positioning point 1020 (expressed by an "inverted triangle" symbol) and a second principal line positioning point 1030 (expressed by a "dot" symbol) are determined, and the first principal line positioning point 1020 and the second principal line positioning point 1030 are connected to obtain a target line segment 1040.

In some embodiments, a rectangular region having a preset edge length is used as the third region by using a line segment midpoint of the target line segment as a center.

Exemplarily, the preset edge length includes a preset fixed value, and also includes a value determined based on the palmprint generation region.

For example, the preset edge length is a preset fixed value, during determination of the third region based on the midpoint of the line segment, and the rectangular region determined in the palmprint generation region by using the midpoint of the line segment as the center and the preset fixed value as the edge length is used as the third region. For example, the preset fixed value includes: a length a of the rectangle and a width b of the rectangle, and the third region is obtained by using the midpoint of the line segment as the center, the length as of the rectangle a the length of the third region and the width b of the rectangle as the width of the third region.

Or, the preset edge length is a value determined based on the palmprint generation region (for example, a half of the edge length in the palmprint generation region is used as the edge length; or, a half of the target line segment in the palmprint generation region is used as the edge length, etc.), and during determination of the first region based on the midpoint of the line segment, the third region is determined in the palmprint generation region by using the midpoint of the line segment as the center and the value determined based on the palmprint generation region as the edge length, etc.

For example, as shown in FIG. 10, after the target line segment 1040 is obtained, the third region 1050 is obtained by using the midpoint of the line segment of the target line segment 1040 as the center and the preset fixed value as the edge length.

In one embodiment, supposed that the coordinate of the midpoint of the target line segment of a connecting line of the first principal line positioning point and the second principal line positioning line is $(x_c, y_c)$, a process of determining the third region by using the coordinate $(x_c, y_c)$ of the midpoint as the center and the target line segment as the judgment standard is as follows.

Exemplarily, the length of the palmprint generation region is a unit length 1, and the third region to be obtained is a square region. The edge length of the square region is preset to be ⅔, and the third region is a square region using the coordinate $(x_c, y_c)$ of the midpoint as the center, being parallel to the target line segment and having the edge length of ⅔.

In some embodiments, the third region is defined by a linear equation determination method, and a linear equation is uniquely determined by the principal line positioning point and the second principal line positioning point. Exemplarily, a straight line in which the target line segment of the connecting line of the first principal line positioning point and the second principal line positioning point is defined as a straight line A, the straight line A is $y=k_1x+b_1$. Identically, a straight line B passing through the coordinate $(x_c, y_c)$ of the midpoint and being perpendicular to the straight line A is defined as $y=k_2x+b_2$.

$k_1$ is used for indicating the slope corresponding to the straight line A; $b_1$ is used for indicating the intercept corresponding to the straight line A; $k_2$ is used for indicating the slope corresponding to the straight line B; $b_2$ is used for indicating the intercept corresponding to the straight line B; and a relationship among $k_1$, $b_1$, $k_2$ and $b_2$ is shown as follows:

$$\begin{cases} k_1k_2 = -1 \\ k_2x_c + b_2 = y_c \end{cases}$$

That is, the straight line B can be uniquely determined according to the straight line A and the coordinate $(x_c, y_c)$ of the midpoint.

Figures 11, 12:
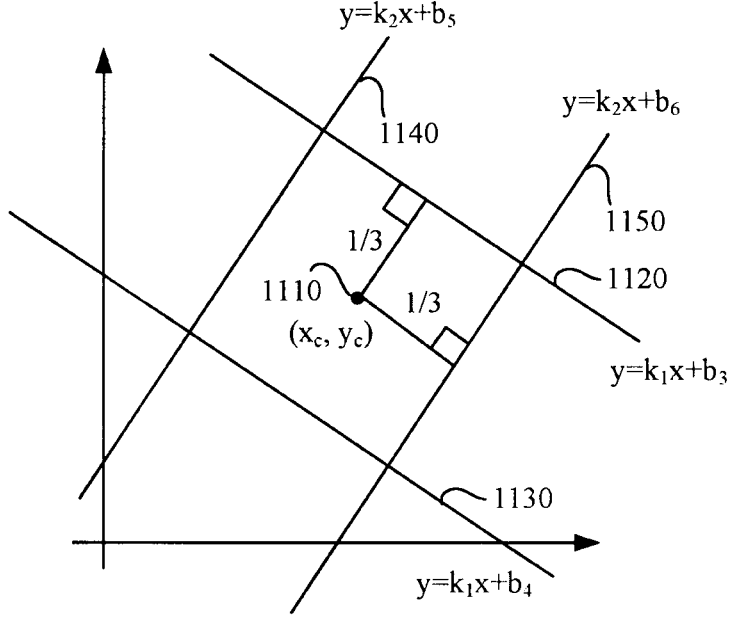
FIG. 11 is a schematic diagram of a determined third region according to an exemplary embodiment of the present disclosure.
FIG. 12 is a flowchart of a method for generating a palmprint sample according to another exemplary embodiment of the present disclosure.

In some embodiments, as shown in FIG. 11, based on the coordinate 1110 $(x_c, y_c)$ of the midpoint and the preset edge length of the third region being ⅔, two straight lines $A_1$1120 and $A_2$1130 being parallel to the straight line A and having a vertical distance being ⅓ away from the straight line A, and two straight lines $B_1$1140 and $B_2$1150 being parallel to the straight line B and having a vertical distance being ⅓ away from the straight line B are respectively determined.

An equation of the straight line $A_1$1120 is $y=k_1x+b_3$. An equation of the straight line $A_2$1130 is $y=k_1x+b_4$. An equation of the straight line $B_1$1140 is $y=k_2x+b_5$. An equation of the straight line $B_2$1150 is $y=k_2x+b_6$.

The above is only an exemplary example, and the embodiment of the present disclosure is not limited by the exemplary example.

As shown in FIG. 11, according to the above four straight lines: the straight line $A_1$1120, the straight line $A_2$1130, the straight line $B_1$1140 and the straight line $B_2$1150, values of the four straight lines can be uniquely determined, the square region defined by the four straight lines can be determined, and the square region is used as the third region.

Step 750: Generate the adjusting point data in the third region.

In some embodiments, after the third region is determined, the adjusting point data used for adjusting the principal line curving parameter is generated in the third region. Exemplarily, a value range of the coordinate of the adjusting point data may be defined in a form as follows:

$$\begin{cases} k_1x + b_3 \leq y \\ k_1x + b_4 \geq y \\ k_2x + b_5 \leq y \\ k_2x + b_6 \geq y \end{cases}$$

In the formula, $k_1$ is used for indicating the slope corresponding to the straight lines $A_1$1120 and $A_2$1130. $b_3$ is used for indicating the intercept corresponding to the straight line $A_1$1120. $b_4$ is used for indicating the intercept corresponding to the straight line $A_2$1130. $k_2$ is used for indicating the slope corresponding to the straight lines $B_1$1140 and $B_2$1150. $b_5$ is used for indicating the intercept corresponding to the straight line $B_1$1140. $b_6$ is used for indicating the intercept corresponding to the straight line $B_2$1150.

Step 760: Generate a palmprint principal line based on first data, second data and adjusting point data.

The palmprint principal line is a curve formed by connecting the first principal line positioning point and the second principal line positioning point with a curving parameter controlled by the principal line adjusting point.

Exemplarily, the palmprint principal line is a curve obtained by connecting the first principal line positioning point and the second principal line positioning point with a curving parameter controlled by the principal line adjusting point. The coordinate positions of the first principal line positioning point and the second principal line positioning point are certain, the curving parameter of the line segment defined by the first principal line positioning point and the second principal line positioning point can be adjusted by the principal line adjusting point, so that different palmprint principal lines can be obtained. That is, there is a close relationship between the position of the principal line adjusting point and the formation of the palmprint principal line.

Step 770: Generate at least one palmprint sample including the palmprint principal line and the palmprint fine lines.

The palmprint sample is used for training a palmprint recognition model, and the palmprint recognition model is used for palmprint recognition.

Exemplarily, the palmprint principal line and the palmprint fine lines are included in the palmprint sample. After the at least one palmprint sample including the palmprint principal line is obtained, training is performed on the palmprint recognition model based on the at least one palmprint sample so that the palmprint recognition model learns the relationship and differences between different palmprint samples, and the recognition efficiency of the palmprint recognition model in the palmprint recognition process is higher.

In some embodiments, after the generated palmprint sample is obtained, tiny disturbance is added to the palmprint sample in the predetermined disturbing interval, and the palmprint sample after tiny disturbance addition is regarded as the palmprint data corresponding to the same ID. Exemplarily, in the predetermined disturbing interval, various different disturbing operations are performed on the same palmprint sample to obtain a plurality of palmprint data corresponding to the palmprint sample. For example, in a predetermined disturbing interval, the palmprint principal line of the palmprint sample is disturbed by aiming at one palmprint sample to obtain a palmprint datum; and the palmprint fine lines in the palmprint sample are disturbed to obtain another palmprint datum, etc. The palmprint sample and the palmprint data obtained based on the palmprint sample are used as the palmprint data corresponding to the same ID. More diversified palmprint samples can be formed through a process of performing tiny disturbance on the palmprint sample in a certain disturbing interval. In some embodiments, in a process of disturbing the palmprint sample in the disturbing interval, the palmprint data belonging to the same ID can be obtained after once disturbance on the palmprint sample; and the palmprint data belonging to the same ID as the palmprint sample can be obtained after disturbance for many times on the palmprint sample. In response to that the palmprint sample is subjected to disturbance for many times, the total value of the disturbance for may times is located in the disturbing interval. The above is only an exemplary example, and the embodiment of the present disclosure is not limited by the exemplary example.

Based on the above, the generated curve obtained by connecting the first principal line positioning point and the second principal line positioning point with a curving parameter controlled by the principal line adjusting point is used as the palmprint principal line, the at least one palmprint sample including the palmprint principal line is obtained, and the palmprint recognition model is trained by using the palmprint sample. By the method, mass palmprint samples are obtained through simulation according to the palmprint principal line distribution condition, so that the generated palmprint samples have higher diversity. The palmprint recognition model is trained based on the palmprint sample, the limitation of the palmprint dataset can be broken, and the robustness of the palmprint recognition model is improved.

In the method provided by the embodiment of the present disclosure, a process of obtaining the palmprint sample according to region division is illustrated. According to the palmprint principal line distribution rule, the first region and the second region corresponding to the trend of the palmprint principal line are determined, the first data is determined in the first region, the second data is determined in the second region, the third region is determined according to the palmprint principal line curving rule, the adjusting point data is generated in the third region, and the first principal line positioning point corresponding to the first data and the second principal line positioning point corresponding to the second data are connected based on the principal line adjusting point to generate at least one palmprint sample including the palmprint principal line. By the method, the palmprint principal line distribution rule and the palmprint principal line curving rule are shown in a region division manner, the position information of the first principal line positioning point and the second principal line positioning point in the palmprint principal line can be more vividly determined, so that the principal line adjusting point is determined. The curve obtained after connecting the first principal line positioning point and the second principal line positioning point with a curving parameter controlled by the principal line adjusting point is used as the palmprint principal line, the palmprint sample including the palmprint principal line is further obtained, and tiny disturbance is performed on the generated palmprint sample in the predetermined disturbing interval (for example, disturbance is performed on any one or several points in the first principal positioning point, the principal line adjusting point and the second principal line positioning point) to obtain a plurality of palmprint data belonging to the same ID and having higher diversity, and the diversity of the palmprint sample is further improved.

In one embodiment, the palmprint recognition model is trained by using at least one palmprint sample after the at least one palmprint sample is obtained. Exemplarily, as shown in FIG. 12, after step 240 as shown in FIG. 2 above, the following step 1210 to step 1230 are also included to be implemented.

Step 1210: Acquire a sample image set.

The sample image set stores at least one sample image.

Exemplarily, the sample image in the sample image set includes various types, for example, a scenery type image, a building type image, an animal type scenery and a plant type image. In some embodiments, the sample image set is a large-scale classified image dataset, such as an ImageNet dataset.

Step 1220: Combine the palmprint sample with the sample image by using the sample image as a background to obtain a target image.

Exemplarily, a plurality of sample images are selected from the sample image set. The generated palmprint sample is nested on the selected sample image by using the selected sample image as the background to obtain the target sample including the palmprint sample and the sample image.

In some embodiments, the using the selected sample image as the background is used for indicating that the selected sample image is placed at the lower side; and the nesting the generated palmprint sample onto the sample image is used for indicating that the palmprint sample is placed at the upper side. For example, the nesting relationship between the sample image and the palmprint sample is expressed in a layer form. A layer 1 is under a layer 2. That is, the sample image is the layer 1, and the target sample is the layer 2.

In one embodiment, the color of textures such as the palmprint principal lines and the palmprint fine lines in the palmprint samples is set to be c, the width is set to be w, the palmprint sample is placed at an upper layer, and the sample image I selected from the sample image set is placed at a lower layer. That is, the palmprint sample is nested onto the sample image I obtain a target image. Exemplarily, a process of obtaining the target image by nesting is shown as follows:

$$S = \text{synthesize}(P, Q, c, w, I)$$

S is used for indicating the target image obtained by nesting the palmprint sample (including the palmprint principal line and the palmprint fine lines) onto the sample image I; synthesize is used for indicating a process of combining the palmprint sample with the sample image I to generate the target image; P is used for indicating the palmprint principal line corresponding to the palmprint sample; and Q is used for indicating the palmprint fine lines corresponding to the palmprint sample.

Exemplarily, after the palmprint sample is generated, the texture feature information such as the color, length and width of the corresponding palmprint principal line and palmprint fine lines of the palmprint sample are certain. Additionally, the texture position information of the palmprint principal line and the palmprint fine lines is relatively certain, based on the above texture information, the palmprint sample is nested onto the target image obtained from the sample image, and the nested palmprint sample is identical to the un-nested palmprint sample. That is, the nested palmprint sample and the un-nested palmprint sample correspond to the same texture feature information and texture position information.

Exemplarily, in a process of nesting the palmprint sample to the sample image, in response to that the size of the sample image is different from the size of the palmprint sample generation region, the nesting processes may be different. For example, in response to that the size of the sample image is greater than the size of the palmprint sample generation region, the palmprint sample is directly nested on the sample image, or the sample image is contracted to a certain size (such as the size of the palmprint sample generation region), and then, the palmprint sample is nested onto the sample image; and in response to that the size of the sample image is smaller than the size of the palmprint sample generation region, the palmprint sample is directly nested on the sample image, or the sample image is enlarged to a certain size (such as the size of the palmprint sample generation region), and then, the palmprint sample is nested onto the sample image, etc.

The above is only an exemplary example. The embodiments of the present disclosure are not limited by the exemplary example.

In one embodiment, the at least one palmprint sample is disturbed in a target disturbing interval to obtain a target sample.

Exemplarily, the target disturbing interval includes a palmprint principal line disturbing interval and a palmprint fine line disturbing interval.

The palmprint principal line disturbing interval is used for indicating an interval range of disturbing the palmprint principal line. The palmprint fine line disturbing interval is used for indicating an interval range of disturbing the palmprint fine lines.

In some embodiments, the palmprint sample is disturbed in a target disturbing interval to obtain a plurality of target samples. For example, the palmprint principal line of the palmprint sample is disturbed in the palmprint principal line disturbing interval to obtain a plurality of target samples with slightly changed palmprint principal lines; or the palmprint fine lines of the palmprint sample are disturbed in the palmprint fine line disturbing interval to obtain a plurality of target samples with slightly changed palmprint fine lines; or the palmprint principal line and the palmprint fine lines of the palmprint print sample are disturbed in the target disturbing interval to obtain a plurality of target samples with slightly changed palmprint principal line and palmprint fine lines.

In some embodiments, the finally imaged palmprint on different photos of the same hand palm may generate tiny differences due to factors such as palm postures, shooting angles and shooting positions in the palmprint distribution conditions of the palmprint. Exemplarily, based on the consideration on improving the robustness of the model, tiny disturbance is added to the generated palmprint sample, and the palmprint sample after tiny disturbance addition is regarded as the palmprint data corresponding to the same D.

In one embodiment, the disturbance on the at least one palmprint sample may be implemented as follows: noise is added to the palmprint principal line corresponding to the at least one palmprint sample; or noise is added to the palmprint fine lines corresponding to the at least one palmprint sample.

Exemplarily, a process of increasing disturbing noise to the generated palmprint sample is shown as follows:

$$\begin{cases} P^i_j = P^i + N_p \\ Q^i_j = Q^i + N_q \end{cases}$$

$P^i$ is used for indicating the palmprint principal line in an $i^{th}$ palmprint sample.

$$P^i_j$$

is used for indicating a $j^{th}$ palmprint sample after disturbing noise addition based on the palmprint principal line. N is used for indicating disturbing noise added to the palmprint principal line. $Q^i$ is used for indicating the palmprint fine lines in an $i^{th}$ palmprint sample.

$$Q_j^i$$

is used for indicating a $j^{th}$ palmprint sample after disturbing noise addition based on the palmprint principal line. $N_q$ is used for indicating disturbing noise added to the palmprint fine lines. In some embodiments, the disturbing noise $N_p \sim \mathcal{N}(\mu, 0.04)$ and the disturbing noise $N_q \sim \mathcal{N}(\mu, 0.01)$ are both very tiny gaussian noise.

In one embodiment, the palmprint principal line corresponding to the at least one palmprint sample is disturbed in the palmprint principal line disturbing interval to obtain a disturbed principal line. The palmprint fine lines corresponding to the at least one palmprint sample is disturbed in the palmprint fine line disturbing interval to obtain disturbed fine lines. The target sample is obtained based on the disturbed principal line and the disturbed fine lines.

Exemplarily, the disturbing noise $N_p$ is the palmprint principal line disturbing interval corresponding to the palmprint principal line. The disturbing noise $N_q$ is the palmprint fine line disturbing interval corresponding to the palmprint fine lines. The disturbing noise $N_p$ and the disturbing noise $N_q$ are called by a joint name of the target disturbing interval.

Figure 13:
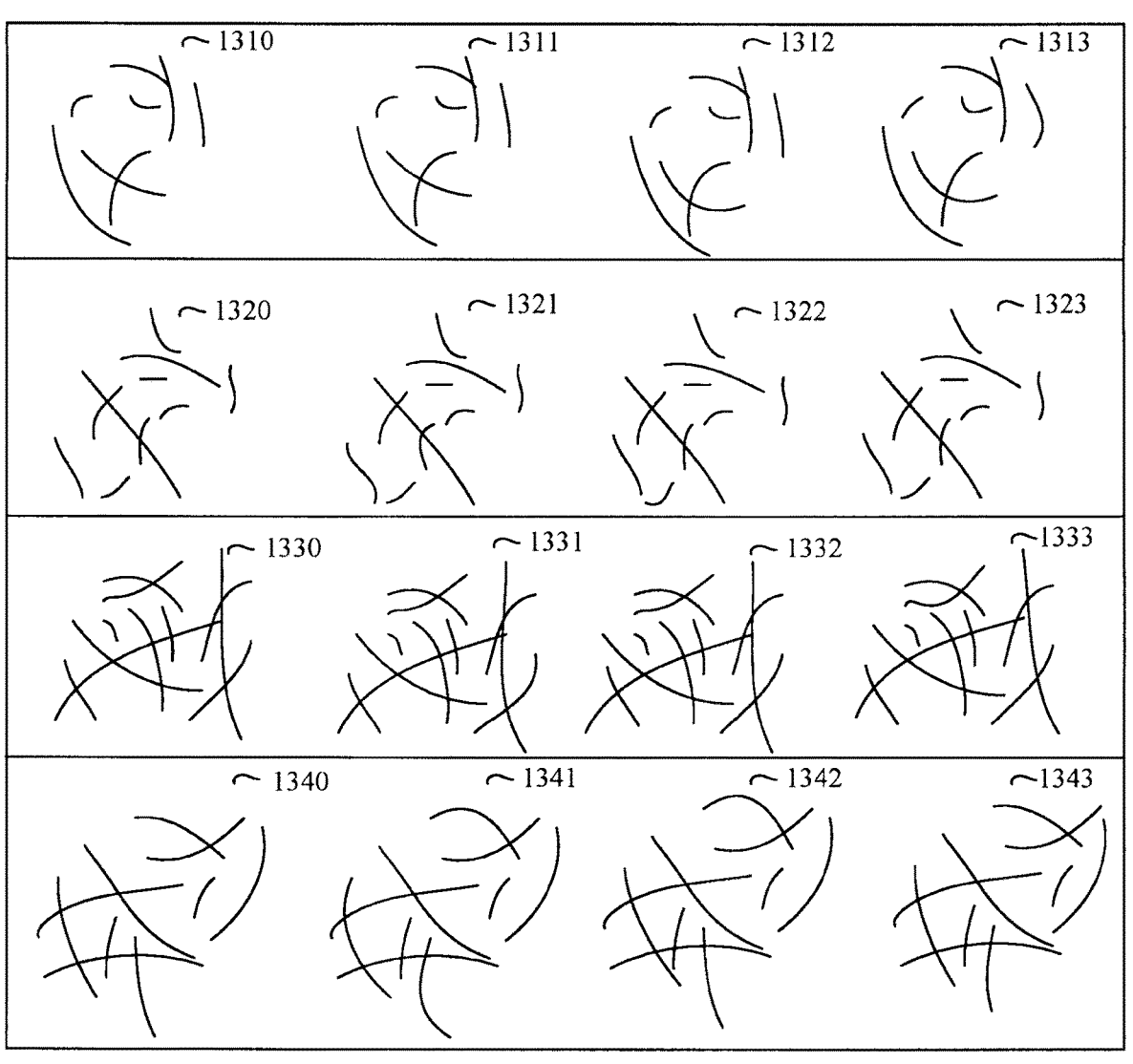
FIG. 13 is a schematic diagram of a palmprint sample according to an exemplary embodiment of the present disclosure.

As shown in FIG. 13, it is a schematic diagram of a plurality of groups of palmprint samples obtained after the addition of the disturbing noise to the palmprint samples. In some embodiments, a palmprint sample 1310, a palmprint sample 1320, a palmprint sample 1330 and a palmprint sample 1340 are palmprint samples obtained based on the method for generating a palmprint sample.

Exemplarily, the disturbance on the palmprint sample 1310 is taken as an example for illustration. In the target disturbing interval, tiny gaussian noise is added to the palmprint principal line and the palmprint fine lines of the palmprint sample 1310 to obtain a target sample 1311, a target sample 1312 and a target sample 1313, and the target sample 1311, the target sample 1312 and the target sample 1313 are used as the palmprint data corresponding to the same ID.

Or, the disturbance on the palmprint sample 1320 is taken as an example for illustration. In the target disturbing interval, tiny gaussian noise is added to the palmprint principal line and the palmprint fine lines of the palmprint sample 1320 to obtain a target sample 1321, a target sample 1322 and a target sample 1323, and the target sample 1321, the target sample 1322 and the target sample 1323 are used as the palmprint data corresponding to the same ID, etc.

Based on the same method, a target sample 1331, a target sample 1332 and a target sample 1333 corresponding to the palmprint sample 1330 are obtained, and the target sample 1331, the target sample 1332 and the target sample 1333 are used as the palmprint data corresponding to the same ID. A target sample 1341, a target sample 1342 and a target sample 1343 corresponding to the palmprint sample 1340 are also obtained, and the target sample 1341, the target sample 1342 and the target sample 1343 are used as the palmprint data corresponding to the same ID.

That is, in the above process, the quantities of the palmprint principal line and palmprint fine lines in the target samples corresponding to the same ID are certain, and the tiny change caused by addition of disturbing noise in a target disturbing range is allowed, that is, the palmprint data obtained after the addition of the disturbing noise in the target disturbing range is still regarded as the palmprint data of the same ID.

The above is only an exemplary example. The embodiments of the present disclosure are not limited by the exemplary example.

In one embodiment, the target sample is nested onto the sample image by using the sample image as a background to obtain a target image.

In some embodiments, the using the sample image as the background is used for indicating that the sample image is placed at the lower side; and the combining the target sample with the sample image is used for indicating that the target sample is placed at the upper side. For example, through being expressed by a nesting relationship between the layers and the images, a layer 1 is under a layer 2, and the sample image is the layer 1; and the target sample is the layer 2.

Figure 14:
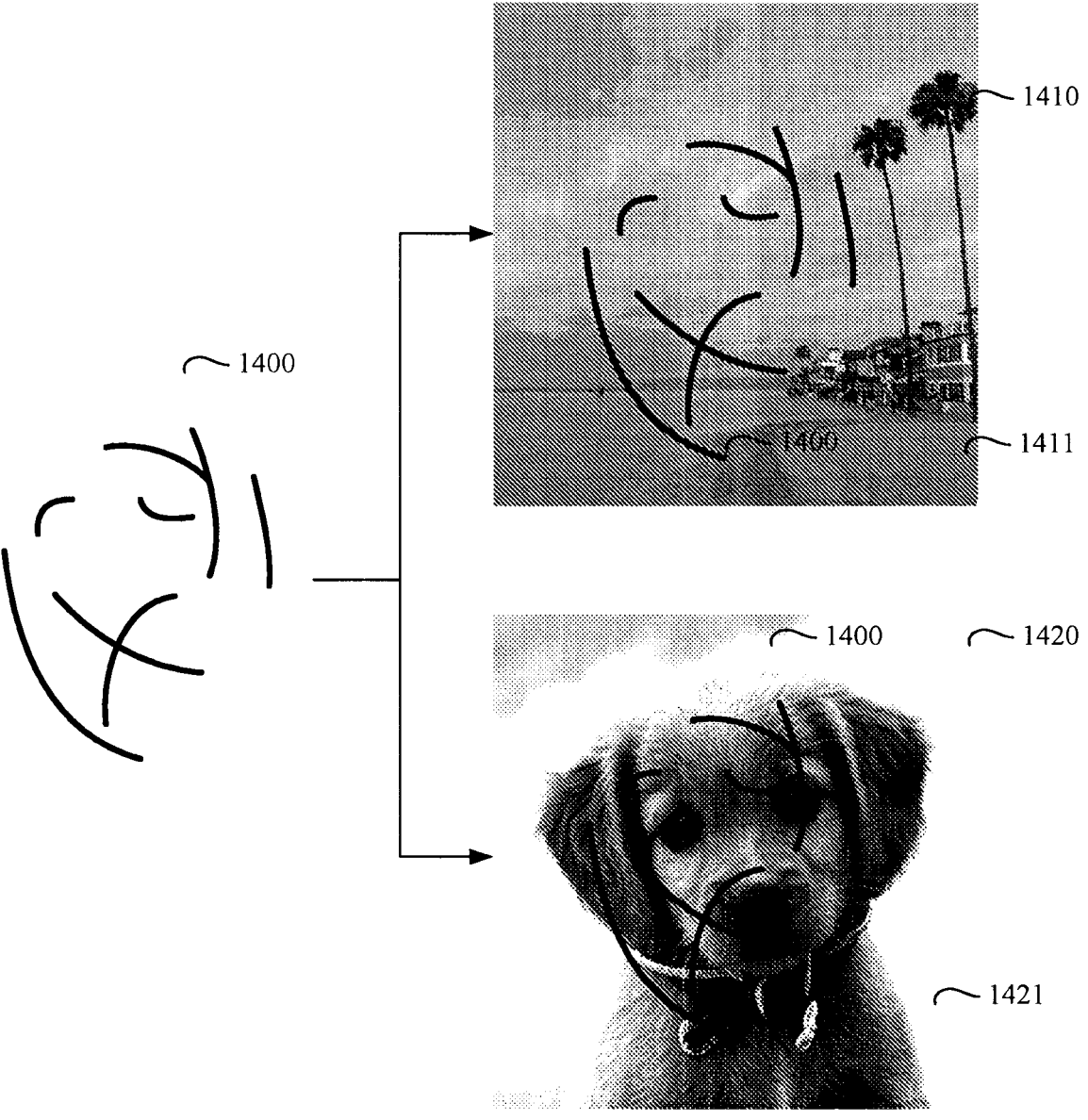
FIG. 14 is a schematic diagram of a target image according to an exemplary embodiment of the present disclosure.

Exemplarily, as shown in FIG. 14, it is a schematic diagram of a target image obtained by combining the target sample with the sample image. For example, a target image 1410 is an image obtained by nesting a target sample 1400 onto a scenery image 1411. The scenery image 1411 is the sample image; or the target image 1420 is an image obtained by nesting the target sample 1400 onto an animal image 1421, and the animal image 1421 is the sample image.

In some embodiments, various images having different parameters such as image dimensions and image qualities may also be used as the sample images, for example, the sample images may be images with high definition, or may be images with low definition, etc.

Step 1230: Train a palmprint recognition model by using the target image.

In one embodiment, first training is performed on the palmprint recognition model by using the target image to obtain a candidate palmprint recognition model.

Exemplarily, after at least one target image respectively corresponding to a plurality of Ids is obtained, the target image is used as the input of the palmprint recognition module to perform first training on the palmprint recognition model.

For example, after one palmprint sample is obtained by the above palmprint generation method, the palmprint principal line and the palmprint fine lines of the palmprint sample are disturbed to obtain a plurality of target samples, the plurality of target samples correspond to an ID A, each of the target samples is placed onto different types of sample images to obtain a plurality of target images, the plurality of target images also correspond to the ID A, the plurality of target images corresponding to the ID A are input into the palmprint recognition model, and then, the palmprint recognition model learns the target images, so that the occurrence of problem of overfitting of the palmprint recognition model on the texture color, texture width and background content of the palmprint principal line, palmprint fine lines, etc. of the palmprint sample can be prevented.

In some embodiments, the color of textures such as the palmprint principal lines and the palmprint fine lines in the palmprint samples is set to be c, the width is set to be w, and the sample image I is randomly selected from the sample image set to be used as the background of the target image. Exemplarily, the generated palmprint texture is summarized as follows:

$$S_j^i = \text{synthesize}(P_j^i, Q_j^i, c, w, I)$$

synthesize is used for indicating a process of generating the target image.

$$S_j^i$$

is used for indicating the target image obtained by nesting the generated palmprint sample (including the palmprint principal line and the palmprint fine lines) onto the sample image I.

$$P_j^i$$

is used for indicating a $j^{th}$ palmprint sample after disturbing noise addition based on the palmprint principal line.

$$Q_j^i$$

is used for indicating a $j^{th}$ palmprint sample after disturbing noise addition based on the palmprint principal line.

In one embodiment, the palmprint dataset is obtained.

The palmprint dataset stores at least one palmprint datum, the at least one palmprint datum being correspondingly marked with a data label.

Exemplarily, the palmprint data stored in the palmprint dataset is palmprint data obtained after legal authorization. In some embodiments, data labels correspondingly marked on the palmprint data are configured to distinguish different palmprint data. For example, the palmprint data 1 is palmprint corresponding to a user 1, and the user 1 is used as a data label of the palmprint data 1; or the palmprint data 2 is palmprint obtained from a family palmprint database 2, and the family palmprint database 2 is used as a data label of the palmprint data 1, etc.

The above is only an exemplary example, and the embodiment of the present disclosure is not limited by the exemplary example.

In one embodiment, second training is performed on the candidate palmprint recognition model by using the palmprint data and a data label corresponding to the palmprint data to obtain a target palmprint recognition model.

The target palmprint recognition model is a model obtained after training on the palmprint recognition model.

Exemplarily, the generated palmprint sample is used for improving the model performance at a training stage of the palmprint recognition model, that is, the first training is performed on the palmprint recognition model by using the palmprint sample or the target image corresponding to the palmprint sample to obtain a candidate palmprint recognition model, and at this moment, the candidate palmprint model can better learn the texture information of the generated palmprint sample.

In one embodiment, based on the consideration of using the candidate palmprint model in a practical scenario, second training is performed on the candidate palmprint recognition model by using the palmprint data and a data label corresponding to the palmprint data, and the second training is used for obtaining a model capable of improving the recognition effect of the candidate palmprint model on the real palmprint by using the palmprint data of creatures.

Figure 15:
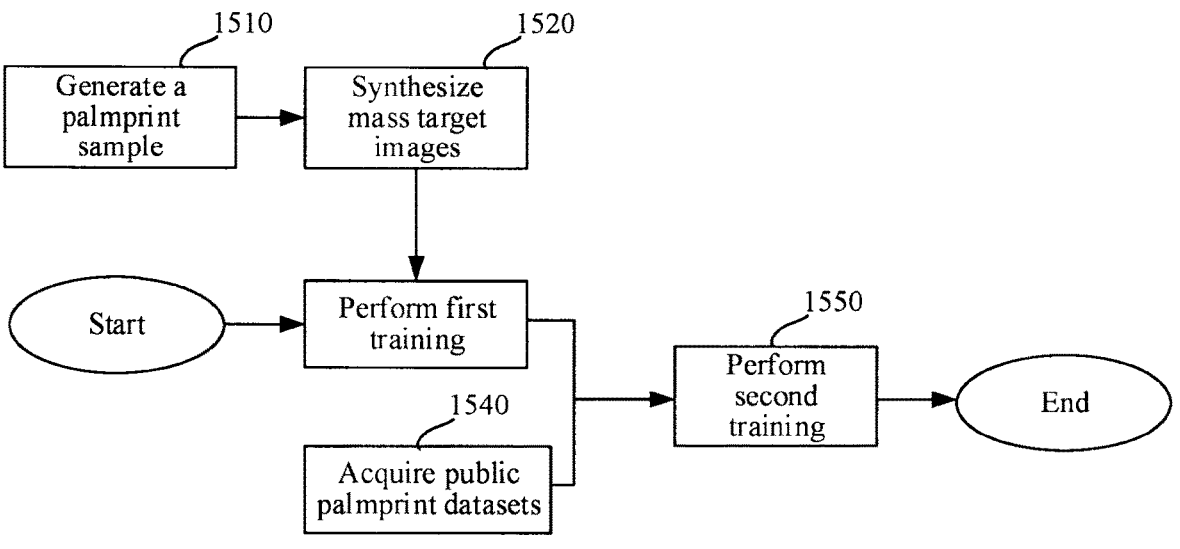
FIG. 15 is a flowchart of palmprint recognition model training according to an exemplary embodiment of the present disclosure.

Exemplarily, as shown in FIG. 15, a training process of performing the first training and the second training on the palmprint model is shown as follows.

Step 1510: Generate a palmprint sample.

In some embodiments, the method for generating a palmprint sample is adopted to obtain a palmprint sample including the palmprint principal line and the palmprint fine lines. The generated palmprint sample can assist the palmprint recognition model to concern the tiny change among textures of the palmprint principal lines, palmprint fine lines, etc., so that the palmprint recognition model can learn features with higher distinguishing power.

Step 1520: Synthesize mass target images.

Exemplarily, after being obtained, the palmprint sample is disturbed to obtain a target sample, and the target sample is nested onto the sample image by using the sample image randomly obtained from the sample image set as a background to obtain a target image.

Step 1530: Perform first training.

In some embodiments, the first training is performed on the palmprint recognition module based on the target image after the mass synthesized images are input into the palmprint recognition model.

Exemplarily, in the mass synthesized target images, a target images of ID A and b target images of ID B are included, the a target images and the b target images are input into the palmprint recognition model, so that the palmprint recognition model learns the palmprint texture information (palmprint principal line information and palmprint fine line information) of the palmprint sample corresponding to different IDs in different target images, etc. For example, the palmprint recognition model learns the similarity among the a target images of the IDA and the similarity among the b target images of the ID B. Additionally, the palmprint recognition model also learns the difference among the a target images of the ID A and the b target images of the ID B, and the similarity of the palmprint texture information of the palmprint sample corresponding to the same ID in different target images and the differences of the palmprint texture information of the palmprint sample corresponding to different IDs in different target images are further determined. In some embodiments, the first training is performed to obtain a candidate palmprint recognition model.

Step 1540: Acquire a public palmprint dataset.

Exemplarily, the public palmprint dataset storing a plurality of palmprint data is obtained based on a legal means, and a plurality of palmprint data marked with data labels are stored in the palmprint dataset.

Step 1550: Perform second training.

In some embodiments, by considering that there may be certain differences between the palmprint data corresponding to the palmprint sample and creatures, and after the first training performed on the palmprint recognition model, the second training is performed on the candidate palmprint recognition model by the palmprint data corresponding to the creatures.

In one embodiment, the palmprint data is inputted into the candidate palmprint recognition model, and a loss value corresponding to the palmprint data is determined based on output data of the candidate palmprint recognition model and the data label corresponding to the palmprint data. The candidate palmprint recognition model is trained by using the loss value. A training target is achieved in response to the training on the candidate palmprint recognition model to obtain the target palmprint recognition model.

Exemplarily, the second training is performed on the candidate palmprint recognition model by using the plurality of palmprint data and a data label corresponding to the plurality of palmprint data based on the plurality of palmprint data in the palmprint dataset. For example, the output of the candidate palmprint recognition model on the palmprint data and the data label corresponding to the palmprint data are subjected to loss value calculation. Based on the loss value calculation result, the candidate palmprint recognition model is subjected to second training by using the loss value reduction as a training target, so that a process of performing tiny adjustment on the candidate palmprint recognition model is achieved.

For example, the palmprint data is inputted into the candidate palmprint recognition model, the candidate palmprint recognition model outputs a prediction label corresponding to the palmprint data, and the loss value corresponding to the palmprint data is determined based on the difference between the prediction label corresponding to the palmprint data and the data label. It is to be understood that the data label is a training label, and is correct label corresponding to the palmprint data, and the prediction label is a label obtained through prediction after data processing on the input data. The training on the model is to enable the model to learn the similarity between the palmprint data corresponding to the same data label in different palmprint data and the differences between the palmprint data corresponding to different data labels in different palmprint data, so that the model can finally output the correct label and the label very similar to the correct label, and the palmprint recognition capability is realized.

In some embodiments, in a process of performing training on the candidate palmprint recognition model by the loss value, the target palmprint recognition model may be obtained by achieving the training target through the training on the candidate palmprint recognition model, and exemplarily, the training target at least includes one of the following conditions.

1. In response to the loss value reaching a convergence state, the candidate palmprint recognition model obtained through the latest time of iteration training is used as the target palmprint recognition model.

Exemplarily, the loss value reaching the convergence state is used for indicating that the value of the loss value obtained through a loss function does not change or a change amplitude is smaller than a preset threshold value. For example, the case that the loss value corresponding to an $n^{th}$ palmprint data is 0.1, and the loss value corresponding to $(n+1)^{th}$ palmprint data is also 0.1 may be regarded as that the loss value reaches the convergence state, and the candidate obtaining times of the loss value is the quantity of the palmprint data in response to that one palmprint datum corresponds to one loss value; or, in response to that one palmprint datum corresponds to a plurality of loss values, the obtaining times of the loss value is the quantity of the loss values. For example, it is preset that one loss value can be obtained through once obtaining, the obtaining time threshold value of the loss value is 10 times, that is, in response to that the obtaining time threshold value is reached, the candidate palmprint recognition model of the latest loss value adjustment is used as the target palmprint recognition model, or the candidate palmprint recognition model of the smallest loss value adjustment in the 10 times of the loss value adjusting process is used as the target palmprint recognition model to realize the process of training the candidate palmprint recognition model.

Figure 16:
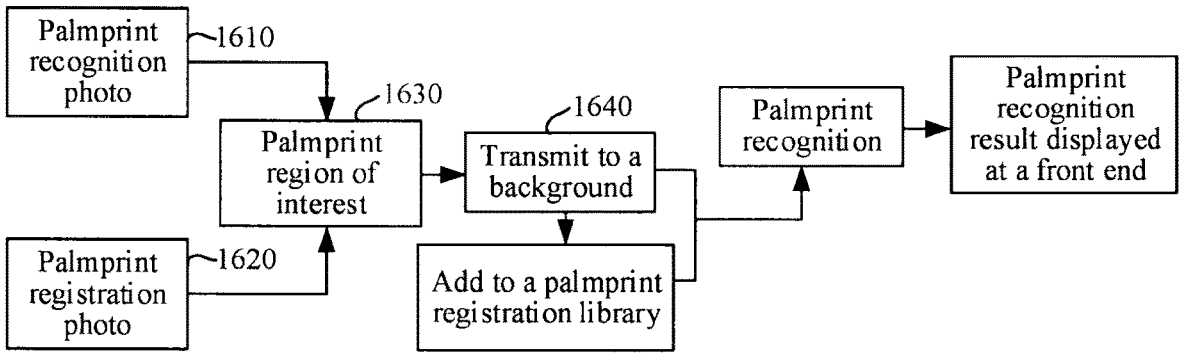
FIG. 16 is a flowchart of a palmprint recognition process according to an exemplary embodiment of the present disclosure.

In one embodiment, after the target palmprint recognition model is obtained, the palmprint is recognized. Exemplarily, as shown in FIG. 16, it is a flowchart of palmprint recognition.

At first, a palmprint recognition photo 1610 and a palmprint registration photo 1620 are shot, a hand palm corresponding the palmprint is detected based on the palmprint recognition photo 1610 and the palmprint registration photo 1620, and a palmprint region of interest 1630 is obtained through extraction. Then, the palmprint region of interest 1630 is transmitted to a background 1640 (such as a server), and the background 1640 adds the palmprint recognition photo 1610, the palmprint registration photo 1620 and the palmprint region of interest 1630 to a palmprint registration library; and finally, the background 1640 recognizes the palmprint based on the target palmprint recognition model of this end. In some embodiments, after the palmprint recognition, the palmprint recognition result is displayed at a front end (such as a terminal device).

Exemplarily, the palmprint recognition result includes a result shown in a "YES" or "NO" form, and also includes a result in a value expression form such as probabilities. The above is only exemplary examples, and the embodiments of the present disclosure are not limited by the exemplary examples.

As shown in the following table, the recognition data of the target palmprint recognition model and recognition data obtained through other palmprint recognition technologies are included.

TABLE 1

| Method | CASIA | IITD | PolyU | TCD | MPD |
|---|---|---|---|---|---|
| PalmNet | 97.17/3.21 | 97.31/3.83 | 99.95/0.39 | 99.89/0.40 | 91.88/6.22 |
| ArcFace | 97.92/0.009 | 98.73/0.012 | 98.58/0.014 | 98.83/0.008 | 96.12/0.022 |
| ArcFace + ours | 99.75/0.004 | 100.0/0.000 | 100.0/0.000 | 100.0/0.000 | 99.96/0.001 | palmprint recognition model with the adjusted loss value corresponding to the $n^{th}$ palmprint data or the $(n+1)^{th}$ palmprint data is used as the target palmprint recognition model, and the process of training the candidate palmprint recognition model is realized.

2. In response to the obtaining times of the loss value reaching a time threshold value, the candidate palmprint recognition model obtained through the latest time of iteration training is used as the target palmprint recognition model.

Exemplarily, one loss value can be obtained through once obtaining, the obtaining times of the loss value for training the candidate palmprint recognition model is preset, and the Table 1 shows recognition effects of the target palmprint recognition model and other methods in the palmprint recognition field on 5 public datasets. The five public datasets are respectively: Chinese affective lexical database of Institute of Automation, Chinese Academy of Sciences (CASIA), datasets of Indian Institute of Technology Delhi (IITD), datasets of Polytechnic University (PolyU), datasets of Trinity College Dublin (TCD) and Maintenance Planning Documents (MPD). Evaluation indexes are respectively: Top-1 and Equal Error Rate (EER). A communication protocol (PalmNet) is a most advanced method at present in the palmprint field, and is used as a control herein.

A higher value of the Top-1 index represents a better recognition effect, and a smaller value of the EER index represents a better recognition effect. Exemplarily, a baseline method ArcFace technology is adopted, and its backbone network is a MobileFaceNet. From the above table, it can be known that the palmprint recognition effect of the target palmprint recognition model is more excellent to that of other methods.

Based on the above, the generated curve obtained by connecting the first principal line positioning point and the second principal line positioning point with a curving parameter controlled by the principal line adjusting point is used as the palmprint principal line, the at least one palmprint sample including the palmprint principal line is obtained, and the palmprint recognition model is trained by using the palmprint sample. By the method, mass palmprint samples are obtained through simulation according to the palmprint principal line distribution condition, so that the generated palmprint samples have higher diversity. The palmprint recognition model is trained based on the palmprint sample, the limitation of the palmprint dataset can be broken, and the robustness of the palmprint recognition model is improved.

In the method provided by the embodiment of the present disclosure, a process of training the palmprint recognition model by using at least one palmprint sample is illustrated. Firstly, a sample image set is obtained. Then, the palmprint sample is nested onto the sample image by using the sample image in the sample image set as the background to obtain a target image. The palmprint recognition model is further trained by using the target image to obtain the target palmprint recognition model. By the above method, the palmprint recognition performance of the target palmprint recognition model in the real scenario can be improved. Additionally, the additional calculation amount and training burden cannot be added by using the target palmprint recognition model. This is a simple, convenient and effective training optimization scheme.

Figures 17, 18:
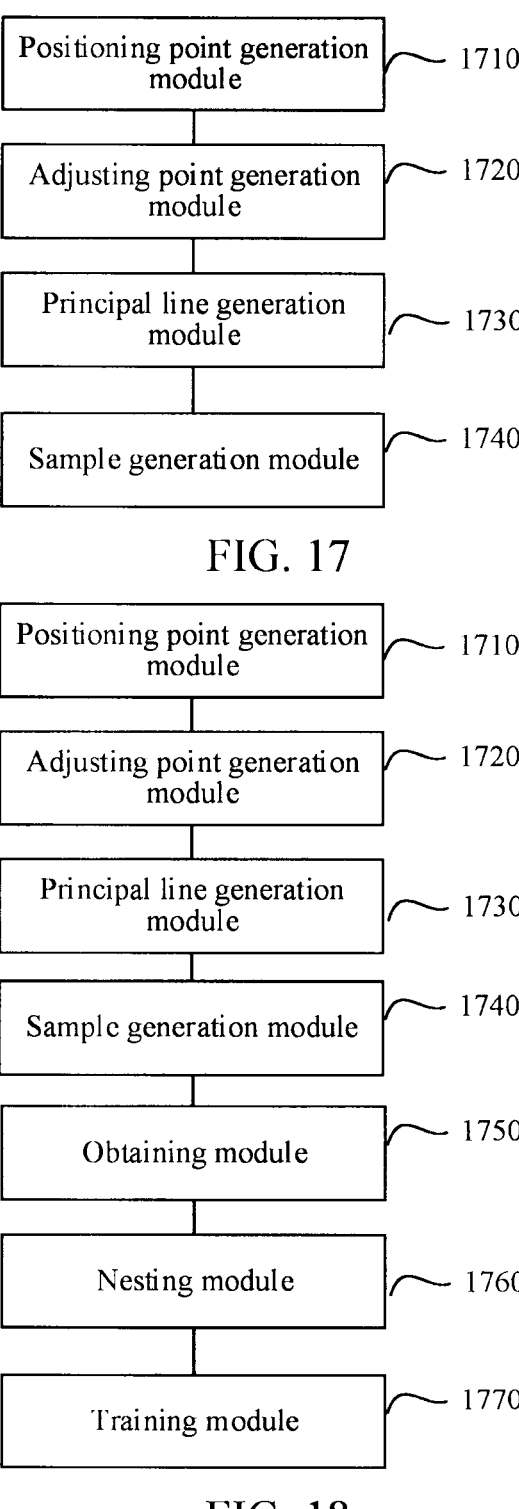
FIG. 17 is a structural block diagram of an apparatus for generating a palmprint sample according to an exemplary embodiment of the present disclosure.
FIG. 18 is a structural block diagram of an apparatus for generating a palmprint sample according to another exemplary embodiment of the present disclosure.

FIG. 17 is a structural block diagram of an apparatus for generating a palmprint sample according to an exemplary embodiment of the present disclosure. As shown in FIG. 17, the apparatus includes the following parts:

a positioning point generation module 1710, configured to generate positioning point data according to a palmprint principal line distribution rule, the positioning point data including first data corresponding to a first principal line positioning point and second data corresponding to a second principal line positioning point;

an adjusting point generation module 1720, configured to generate adjusting point data according to a palmprint principal line curving rule, a principal line adjusting point corresponding to the adjusting point data being configured to control a curving parameter of a principal line formed by the first principal line positioning point and the second principal line positioning point;

a principal line generation module 1730, configured to generate a palmprint principal line based on the first data, the second data and the adjusting point data, the palmprint principal line being a curve formed by connecting the first principal line positioning point and the second principal line positioning point with a curving parameter controlled by the principal line adjusting point; and a sample generation module 1740, configured to generate at least one palmprint sample including the palmprint principal line, the palmprint sample a training sample for a palmprint recognition model, and the palmprint recognition model being used for palmprint recognition.

In one embodiment, the positioning point generation module 1710 is also configured to determine a first region and a second region corresponding to the trend of the palmprint principal line according to the palmprint principal line distribution rule; determine the first data corresponding to the first principal line positioning point in the first region; and determine the second data corresponding to the second principal line positioning point in the second region.

In one embodiment, the positioning point generation module 1710 is further configured to determine a palmprint generation region according to the palmprint principal line distribution rule, the palmprint generation region indicating a distribution range of the palmprint principal line; determine a first vertex and a second vertex in a diagonal relationship in the palmprint generation region; determine the first region in the palmprint generation region by using the first vertex as a center and a first preset length as a radius; and determine the second region in the palmprint generation region by using the second vertex as a center and a second preset length as a radius.

In one embodiment, the positioning point generation module 1710 is also configured to determine the first data by randomly selecting the first principal line positioning point in the first region; and determine the second data by randomly selecting the second principal line positioning point in the second region.

In one embodiment, the adjusting point generation module 1720 is also configured to determine a third region based on a position relationship between the first principal line positioning point and the second principal line positioning point according to the palmprint principal line curving rule; and generate the adjusting point data in the third region.

In one embodiment, the adjusting point generation module 1720 is also configured to connect the first principal line positioning point and the second principal line positioning point to obtain a target line segment; and use a rectangular region having a preset edge length as the third region by using a line segment midpoint of the target line segment as a center.

In one embodiment, the palmprint sample also includes palmprint fine lines.

the sample generation module 1740 is also configured to determine at least two palmprint fine line positioning points; generate the palmprint fine lines based on the at least two palmprint fine line positioning points; and generate at least one palmprint sample including the palmprint principal line and the palmprint fine lines.

In one embodiment, the sample generation module 1740 is also configured to connect the at least two palmprint fine line positioning points to obtain palmprint fine lines.

In one embodiment, the sample generation module 1740 is also configured to determine a palmprint fine line adjusting point based on the at least two palmprint fine line positioning points, the palmprint fine line adjusting point being configured to control the curving parameter between the at least two palmprint fine line positioning points; and determine the palmprint fine lines based on the at least two palmprint fine line positioning points and the palmprint fine line adjusting point in the preset palmprint fine line quantity range.

In one embodiment, as shown in FIG. 18, the device further includes:

an acquiring module 1750, configured to acquire a sample image set, and the sample image set stores at least one sample image;

a nesting module 1760, configured to nest the palmprint sample onto the sample image by using the sample image as a background to obtain a target image; and a training module 1770, configured to train the palmprint recognition model by using the target image.

In one embodiment, the nesting module 1760 is further configured to disturb at least one palmprint sample in a target disturbing interval to obtain a target sample; and combine the target sample with the sample image by using the sample image as a background to obtain a target image.

In one embodiment, the target disturbing interval includes a palmprint principal line disturbing interval and a palmprint fine line disturbing interval.

The nesting module 1760 is further configured to disturb the palmprint principal line corresponding to the at least one palmprint sample in the palmprint principal line disturbing interval to obtain a disturbed principal line; disturb the palmprint fine lines corresponding to the at least one palmprint sample in the palmprint fine line disturbing interval to obtain disturbed fine lines; and obtain the target sample based on the disturbed principal line and the disturbed fine lines.

In one embodiment, the nesting module 1760 is further configured to add noise to the palmprint principal line corresponding to the at least one palmprint sample.

In one embodiment, the nesting module 1760 is further configured to add noise to the palmprint fine lines corresponding to the at least one palmprint sample.

In one embodiment, the training module 1770 is further configured to perform first training on the palmprint recognition model by using the target image to obtain a candidate palmprint recognition model; acquire a palmprint dataset, the palmprint dataset storing at least one palmprint datum, the at least one palmprint datum being correspondingly marked with a data label; and perform second training on the candidate palmprint recognition model by using the palmprint data and a data label corresponding to the palmprint data to obtain a target palmprint recognition model, the target palmprint recognition model being a model obtained through training the palmprint recognition model.

In one embodiment, the training module 1770 is further configured to input the palmprint data into the candidate palmprint recognition model, and determine a loss value corresponding to the palmprint data based on output data of the candidate palmprint recognition model and the data label corresponding to the palmprint data; train the candidate palmprint recognition model by using the loss value; and achieve a training target in response to the training on the candidate palmprint recognition model to obtain the target palmprint recognition model.

Based on the above, a first principal line positioning point and a second principal line positioning point are generated according to the palmprint principal line distribution rule, adjusting point data for controlling the principal line curving parameter is generated according to the palmprint principal line curving rule, a curve obtained by connecting the first principal line positioning point and the second principal line positioning point with a curving parameter controlled by the principal line adjusting point is used as the palmprint principal line, at least one palmprint sample including the palmprint principal line is generated, and the palmprint recognition model is trained by using the palmprint sample. Through the apparatus, a plurality of palmprint samples are obtained through simulation according to the distribution condition of the palmprint principal line. Since the palmprint samples are determined in a data (first principal line positioning point, second principal line positioning point and adjusting point data) generation manner, the generated palmprint samples are in a great batch, and the upper limit of the quantity may be not set, so that the generated palmprint samples have higher diversity. During training on the palmprint recognition model based on the generated palmprint samples, the palmprint recognition model may be promoted to mine more texture internal rules and information not involved in the palmprint dataset to break through the limitation of the palmprint dataset and improve the robustness of the palmprint recognition model.

The apparatus for generating a palmprint sample provided in the embodiments is illustrated with an example of division of the foregoing function modules. In practical applications, the foregoing functions may be allocated to and completed by different function modules according to requirements, that is, the internal structure of the device is divided into different function modules, so as to complete all or part of the functions described above. The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. In addition, the apparatus for generating a palmprint sample provided in the embodiments and the method embodiments for generating a palmprint sample fall within a same conception. Reference may be made to the method embodiments for details of a specific implementation process. These details are not described herein again.

Figure 19:
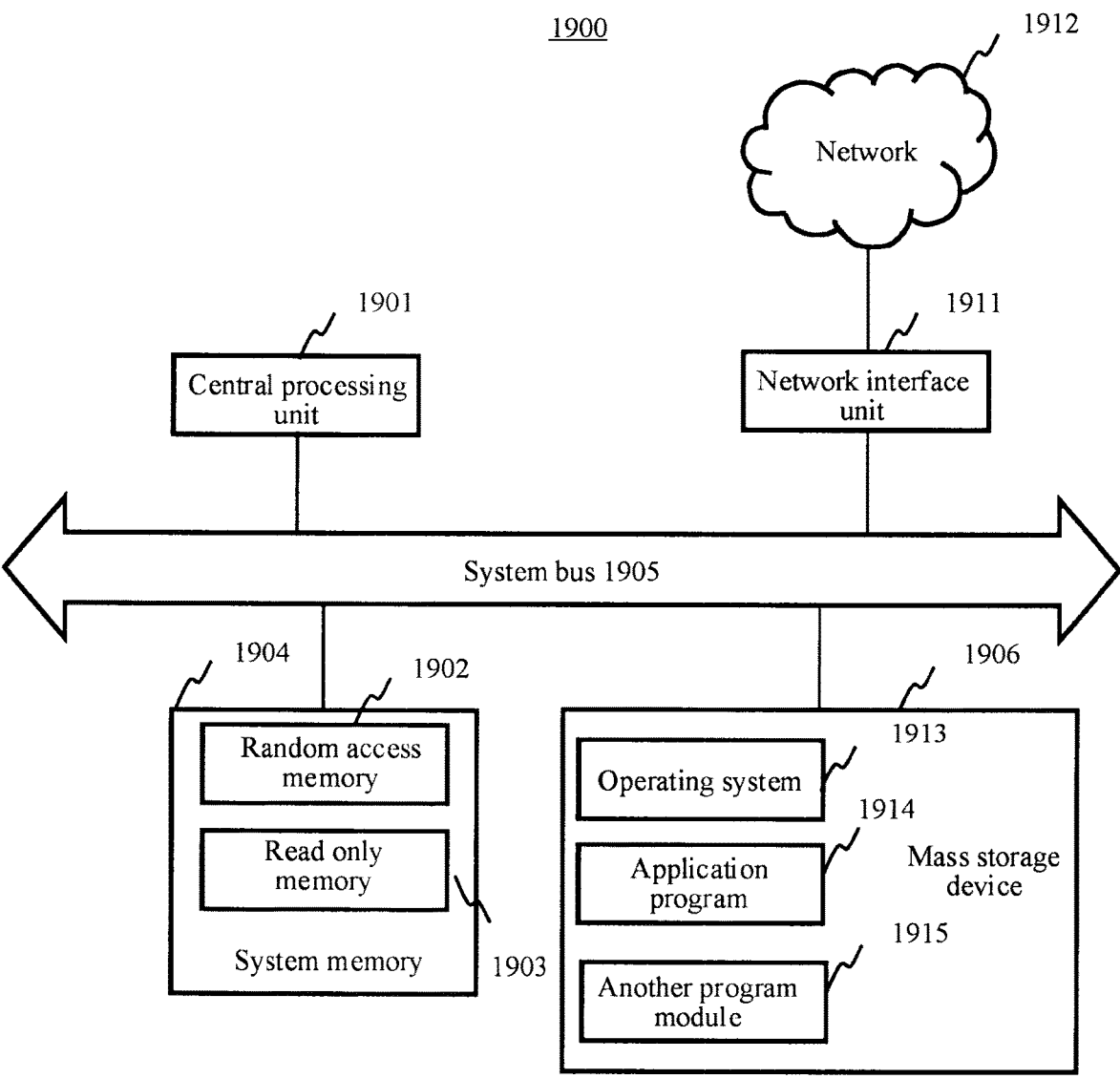
FIG. 19 is a structural block diagram of a server according to an exemplary embodiment of the present disclosure.

FIG. 19 is a schematic structural diagram of a server according to an embodiment of the present disclosure. The server 1900 includes a central processing unit (CPU) 1901, a system memory 1904 including a random access memory (RAM) 1902 and a read-only memory (ROM) 1903, and a system bus 1905 for connecting the system memory 1904 to the CPU 1901. The server 1900 further includes a mass storage device 1906 configured to store an operation system 1913, an application program 1914 and another program module 1915.

The mass storage device 1906 is connected to the CPU 1901 by using a mass storage controller (not shown) connected to the system bus 1905. The mass storage device 1906 and a computer-readable medium associated with the mass storage device provide non-volatile storage for the server 1900. That is, the mass storage device 1906 may include a computer-readable medium (not shown) such as a hard disk or a compact disc read only memory (CD-ROM) drive.

Without loss of generality, the computer-readable medium may include a computer storage medium and a communication medium. The computer storage medium includes volatile and non-volatile removable and non-removable media implemented by using any method or technology used for storing information such as computer-readable instructions, data structures, program modules, or other data. The computer storage medium includes an RAM, an ROM, an erasable programmable read only memory (EPROM), an electrically erasable programmable read only memory (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in art can know that the computer storage medium is not limited to the foregoing several types. The system memory 1904 and the mass storage device 1906 may be collectively referred to as a memory.

According to various embodiments of the present disclosure, the server 1900 may further be connected, by using a network such as the Internet, to a remote computer on the network and run. That is, the server 1900 may be connected to a network 1912 by using a network interface unit 1911 connected to the system bus 1905, or may also be to connected to another type of network or remote computer system (not shown) by using the network interface unit 1911.

The memory further includes one or more programs, which are stored in the memory and are configured to be executed by the CPU.

The embodiment of the present disclosure further provides a computer device. The computer device includes a processor and a memory. The memory stores at least one instruction, at least one program, and a code set or an instruction set, and the at least one instruction, the at least one program, the code set or the instruction set is loaded and executed by the processor to implement the method for generating a palmprint sample provided by each method embodiment described above.

The embodiment of the present disclosure further provides a computer-readable storage medium, the computer-readable storage medium stores at least one instruction, at least one program, a code set or an instruction set, and the at least one instruction, the at least one program, the code set or the instruction set is loaded and executed by a processor to implement the method for generating a palmprint sample provided by each method embodiment described above.

The embodiment of the present disclosure also provides a computer program product or a computer program. The computer program product or the computer program includes a computer instruction. The computer instruction is stored in a computer-readable storage medium. A processor of the computer device reads the computer instruction from the computer-readable storage medium, and the processor executes the computer instruction, so that the computer device executes any one method for generating a palmprint sample in the embodiments.

In some embodiments, the computer-readable storage medium may include: a read-only memory (ROM), a random access memory (RAM), solid state drives (SSD), an optical disc, etc. The RAM may include a resistance random access memory (ReRAM) and a dynamic random access memory (DRAM). The sequence numbers of the embodiments of the present disclosure are merely for a description purpose but do not imply the preference among the embodiments.

A person of ordinary skill in the art may understand that all or some of the steps of the embodiments may be implemented by hardware, or may be implemented by a program instructing relevant hardware. The program may be stored in a computer-readable storage medium. The storage medium may be a read-only memory, a magnetic disk, an optical disc, etc.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for generating a palmprint sample, executed by a computer device, comprising:

generating positioning point data according to a palmprint principal line distribution rule, the positioning point data comprising first data corresponding to a first principal line positioning point and second data corresponding to a second principal line positioning point;

generating adjusting point data according to a palmprint principal line curving rule, a principal line adjusting point corresponding to the adjusting point data being configured to control a curving parameter of a principal line formed by the first principal line positioning point and the second principal line positioning point;

generating a palmprint principal line based on the first data, the second data and the adjusting point data; and generating at least one palmprint sample comprising the palmprint principal line.

2. The method according to claim 1, wherein the generating positioning point data according to a palmprint principal line distribution rule comprises:

determining a first region and a second region corresponding to a trend of the palmprint principal line according to the palmprint principal line distribution rule;

determining the first data corresponding to the first principal line positioning point in the first region; and determining the second data corresponding to the second principal line positioning point in the second region.

3. The method according to claim 2, wherein the determining a first region and a second region corresponding to a trend of the palmprint principal line according to the palmprint principal line distribution rule comprises:

determining a palmprint generation region according to the palmprint principal line distribution rule, the palmprint generation region indicating a distribution range of the palmprint principal line;

determining a first vertex and a second vertex in a diagonal relationship in the palmprint generation region;

determining the first region in the palmprint generation region by using the first vertex as a center and a first preset length as a radius; and determining the second region in the palmprint generation region by using the second vertex as a center and a second preset length as a radius.

4. The method according to claim 2, wherein the determining the first data corresponding to the first principal line positioning point in the first region and determining the second data corresponding to the second principal line positioning point in the second region comprises:

determining the first data by randomly selecting the first principal line positioning point in the first region; and determining the second data by randomly selecting the second principal line positioning point in the second region.

5. The method according to claim 1, wherein the generating adjusting point data according to a palmprint principal line curving rule comprises:

determining a third region based on a position relationship between the first principal line positioning point and the second principal line positioning point according to the palmprint principal line curving rule; and generating the adjusting point data in the third region.

6. The method according to claim 5, wherein the determining a third region based on a position relationship between the first principal line positioning point and the second principal line positioning point comprises:

connecting the first principal line positioning point and the second principal line positioning point to obtain a target line segment; and using a rectangular region having a preset edge length as the third region by using a line segment midpoint of the target line segment as a center.

7. The method according to claim 1, wherein the palmprint sample further comprises palmprint fine lines; and the generating at least one palmprint sample comprising the palmprint principal line comprises:

determining at least two palmprint fine line positioning points;

generating the palmprint fine lines based on the at least two palmprint fine line positioning points; and generating the at least one palmprint sample comprising the palmprint principal line and the palmprint fine lines in a preset palmprint quantity range, the palmprint quantity range comprising at least one of a palmprint principal line quantity range and a palmprint fine line quantity range.

8. The method according to claim 7, wherein the generating the palmprint fine lines based on the at least two palmprint fine line positioning points comprises:

connecting the at least two palmprint fine line positioning points to obtain the palmprint fine lines.

9. The method according to claim 7, wherein the generating the palmprint fine lines based on the at least two palmprint fine line positioning points comprises:

determining a palmprint fine line adjusting point based on the at least two palmprint fine line positioning points, the palmprint fine line adjusting point being configured to control the curving parameter between the at least two palmprint fine line positioning points; and determining the palmprint fine lines based on the at least two palmprint fine line positioning points and the palmprint fine line adjusting point in the preset palmprint fine line quantity range.

10. The method according to claim 1, further comprising:

acquiring a sample image set, the sample image set storing at least one sample image;

combining the palmprint sample with the sample image by using the sample image as a background to obtain a target image; and training a palmprint recognition model by using the target image.

11. The method according to claim 10, wherein the combining the palmprint sample with the sample image by using the sample image as a background to obtain a target image comprises:

disturbing the at least one palmprint sample in a target disturbing interval to obtain a target sample; and combining the target sample with the sample image by using the sample image as a background to obtain the target image.

12. The method according to claim 11, wherein the target disturbing interval comprises a palmprint principal line disturbing interval and a palmprint fine line disturbing interval;

the disturbing the at least one palmprint sample in a target disturbing interval to obtain a target sample comprises:

disturbing a palmprint principal line corresponding to the at least one palmprint sample in the palmprint principal line disturbing interval to obtain a disturbed principal line;

disturbing palmprint fine lines corresponding to the at least one palmprint sample in the palmprint fine line disturbing interval to obtain disturbed fine lines; and obtaining the target sample based on the disturbed principal line and the disturbed fine lines.

13. The method according to claim 11, wherein the disturbing the at least one palmprint sample comprises:

increasing noise for the palmprint principal line corresponding to the at least one palmprint sample.

14. The method according to claim 11, wherein the disturbing the at least one palmprint sample comprises:

increasing noise for the palmprint fine lines corresponding to the at least one palmprint sample.

15. The method according to claim 10, wherein the training the palmprint recognition model by using the target image comprises:

performing first training on the palmprint recognition model by using the target image to obtain a candidate palmprint recognition model;

acquiring a palmprint dataset, the palmprint dataset storing at least one palmprint datum, the at least one palmprint datum being correspondingly marked with a data label; and performing second training on the candidate palmprint recognition model by using the palmprint data and a data label corresponding to the palmprint data to obtain a target palmprint recognition model, the target palmprint recognition model being a model obtained through training the palmprint recognition model.

16. The method according to claim 15, wherein the performing second training on the candidate palmprint recognition model by using the palmprint data and a data label corresponding to the palmprint data to obtain a target palmprint recognition model comprises:

inputting the palmprint data into the candidate palmprint recognition model, and determining a loss value corresponding to the palmprint data based on output data of the candidate palmprint recognition model and the data label corresponding to the palmprint data;

training the candidate palmprint recognition model by using the loss value; and achieving a training target in response to the training on the candidate palmprint recognition model to obtain the target palmprint recognition model.

17. An apparatus for generating a palmprint sample, comprising:

at least one processor and at least one memory, the at least one memory storing at least one instruction, at least one program, and a code set or an instruction set, and the at least one instruction, the at least one program, and the code set or the instruction set being loaded and executed by the at least one processor to implement:

generating positioning point data according to a palmprint principal line distribution rule, the positioning point data comprising first data corresponding to a first principal line positioning point and second data corresponding to a second principal line positioning point;

generating adjusting point data according to a palmprint principal line curving rule, a principal line adjusting point corresponding to the adjusting point data being configured to control a curving parameter of a principal line formed by the first principal line positioning point and the second principal line positioning point;

generating a palmprint principal line based on the first data, the second data and the adjusting point data; and generating at least one palmprint sample comprising the palmprint principal line.

18. The apparatus according to claim 17, wherein the generating positioning point data according to a palmprint principal line distribution rule comprises:

determining a first region and a second region corresponding to a trend of the palmprint principal line according to the palmprint principal line distribution rule;

determining the first data corresponding to the first principal line positioning point in the first region; and determining the second data corresponding to the second principal line positioning point in the second region.

19. The apparatus according to claim 18, wherein the determining a first region and a second region corresponding to a trend of the palmprint principal line according to the palmprint principal line distribution rule comprises:

determining a palmprint generation region according to the palmprint principal line distribution rule, the palmprint generation region indicating a distribution range of the palmprint principal line;

determining a first vertex and a second vertex in a diagonal relationship in the palmprint generation region;

determining the first region in the palmprint generation region by using the first vertex as a center and a first preset length as a radius; and determining the second region in the palmprint generation region by using the second vertex as a center and a second preset length as a radius.

20. A non-transitory computer-readable storage medium, storing at least one instruction, at least one program, and a code set or an instruction set, and the at least one instruction, the at least one program, and the code set or the instruction set being loaded and executed by at least one processor to implement:

generating positioning point data according to a palmprint principal line distribution rule, the positioning point data comprising first data corresponding to a first principal line positioning point and second data corresponding to a second principal line positioning point;

generating adjusting point data according to a palmprint principal line curving rule, a principal line adjusting point corresponding to the adjusting point data being configured to control a curving parameter of a principal line formed by the first principal line positioning point and the second principal line positioning point;

generating a palmprint principal line based on the first data, the second data and the adjusting point data; and generating at least one palmprint sample comprising the palmprint principal line.

* * * * *